(12) United States Patent
Lou et al.

(10) Patent No.: US 11,283,491 B2
(45) Date of Patent: Mar. 22, 2022

(54) MULTI CHANNEL MULTIPLE INPUT MULTIPLE OUTPUT BEAMFORMING TRAINING IN MILLIMETER WAVE SYSTEMS

(71) Applicant: INTERDIGITAL PATENT HOLDINGS, INC., Wilmington, DE (US)

(72) Inventors: Hanqing Lou, Syosset, NY (US); Li Hsiang Sun, San Diego, CA (US); Oghenekome Oteri, San Diego, CA (US); Xiaofei Wang, Cedar Grove, NJ (US); Rui Yang, Greenlawn, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/628,839

(22) PCT Filed: Jul. 6, 2018

(86) PCT No.: PCT/US2018/041074
§ 371 (c)(1),
(2) Date: Jan. 6, 2020

(87) PCT Pub. No.: WO2019/010404
PCT Pub. Date: Jan. 10, 2019

(65) Prior Publication Data
US 2020/0204222 A1 Jun. 25, 2020

Related U.S. Application Data

(60) Provisional application No. 62/529,271, filed on Jul. 6, 2017, provisional application No. 62/553,054, filed on Aug. 31, 2017.

(51) Int. Cl.
*H04B 7/0452* (2017.01)
*H04B 7/0417* (2017.01)

(52) U.S. Cl.
CPC ......... *H04B 7/0417* (2013.01); *H04B 7/0452* (2013.01)

(58) Field of Classification Search
CPC ............... H04B 7/0417; H04B 7/0452; H04B 7/0695; H04B 7/0602; H04B 7/063
See application file for complete search history.

(56) References Cited

U.S. PATENT DOCUMENTS 10,142,005 B2 * 11/2018 Jo ........................... H04B 7/063
10,321,484 B2 * 6/2019 Lou .................... H04W 72/1284
(Continued)

FOREIGN PATENT DOCUMENTS

WO 2016160728 A1 10/2016
WO 2017/078780 5/2017

OTHER PUBLICATIONS

Da Silva et al., "Comment resolution for CID 54," IEEE 802.11-17/1675r0 (Nov. 5, 2017).
(Continued)

*Primary Examiner* — Kenneth T Lam
(74) *Attorney, Agent, or Firm* — Volpe Koenig

(57) ABSTRACT

Systems, methods, and devices for beamforming (BF) training are disclosed. In some examples, a receiver is configured to receive sector sweep (SSW) training frames from an initiator device that each indicate an antenna sector of the initiator device. A transmitter is configured to transmit sector sweep (SSW) training frames to the initiator device that indicate a best received antenna sector of the initiator device. The receiver receives a sector sweep feedback (SSW FB) frame from the initiator device, and the transmitter transmits transmit a sector sweep acknowledgement (SSW ACK) frame to the initiator device that indicates an antenna sector of the initiator device that is different from the antenna sector indicated by the SSW FB frame, if the SSW FB frame (Continued)

was best received by an antenna not corresponding to the best received antenna sector of the initiator device.

20 Claims, 34 Drawing Sheets

(56) References Cited

U.S. PATENT DOCUMENTS

| | | | |
|---|---|---|---|
| 10,367,563 B2 | 7/2019 | Irie et al. | |
| 2011/0064033 A1* | 3/2011 | Gong | H04B 7/0617 |
| | | | 370/329 |
| 2013/0115887 A1* | 5/2013 | Kwon | H04B 7/0408 |
| | | | 455/63.4 |
| 2016/0105229 A1* | 4/2016 | Trainin | H04B 7/0617 |
| | | | 370/329 |
| 2017/0111099 A1* | 4/2017 | Jo | H04B 7/063 |
| 2017/0126303 A1 | 5/2017 | Jo et al. | |
| 2017/0352954 A1* | 12/2017 | Abdallah | H04B 7/088 |
| 2018/0007607 A1* | 1/2018 | Cordeiro | H04B 7/0695 |
| 2018/0227027 A1* | 8/2018 | Trainin | H04B 7/063 |
| 2018/0302137 A1* | 10/2018 | Maltsev | H04B 7/0617 |
| 2019/0182815 A1* | 6/2019 | Bang | H04B 7/06 |
| 2019/0190570 A1* | 6/2019 | Yan | H04B 7/0617 |
| 2019/0349782 A1* | 11/2019 | Kim | H04W 74/006 |
| 2020/0007211 A1* | 1/2020 | Liu | H04W 16/28 |

OTHER PUBLICATIONS

Draft Standard for Information Technology—10 Telecommunications and Information Exchange 11 Between Systems—Local and Metropolitan Area 12 Networks—Specific Requirements—Part 11: Wireless 13 LAN Medium Access Control (MAC) and Physical Layer 14 (PHY) Specifications—15 Amendment 7: Enhanced throughput for operation in 16 license-exempt bands above 45 GHz, IEEE P802.11ay/D0.35 (May 2017).

Draft Standard for Information Technology—10 Telecommunications and Information Exchange 11 Between Systems—Local and Metropolitan Area 12 Networks—Specific Requirements—Part 11: Wireless 13 LAN Medium Access Control (MAC) and Physical Layer 14 (PHY) Specifications—15 Amendment 7: Enhanced throughput for operation in 16 license-exempt bands above 45 GHz, IEEE P802.11ay/D0.41 (Jul. 2017).

Draft Standard for Information Technology—Telecommunications and Information Exchange Between Systems—Local and Metropolitan Area Networks—Specific Requirements—Part 11: Wireless LAN Medium Access Channel (MAC) and Physical Layer (PHY) Specifications—Amendment 7: Enhanced throughput for operation in license-exempt bands above 45 GHz, IEEE P802.11ay/D1.2 (Apr. 2018).

Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 7: Enhanced Throughput for Operation in License-Exempt Bands above 45 GHz, IEEE P802.11ay/D1.0 (Nov. 2017).

IEEE P802.11ad-2012 IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 2012).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE P802.11ah-2016 (Dec. 7, 2016).

Kim et al., "BRP for channel aggregation," IEEE 802.11-17/1674r0 (Nov. 6, 2017).

Maltsev et al., "Enhanced SLS BF flow for efficient AP-STA access in dense environment," 802.11-17/xxxx (802.11-17/0067r1) (Jan. 2017).

Sun et al., "Discussion on SLS with different Tx and Rx antennas," IEEE 802.11-17/1623r0 (Nov. 2017).

Sun et al., "Draft text for CR CID 2327," IEEE 802.11-18/0172r2 (Jan. 2018).

Sun et al., "Draft text for SSW-Feedback/Ack to avoid selecting different Tx and Rx antennas," IEEE 802.11-17/1622r1, (Nov. 2017).

Sun et al., "IEEE 802.11 TGay Use Cases," IEEE 802.11-2015/0625r2 (May 2015).

Park et al., "SSW-Feedback & SSW-ACK for Short SSW Packet," IEEE 802.11-17/0109r0 (Jan. 18, 2017).

* cited by examiner

| Field | Number of Bits | Start Bit | Description |
|---|---|---|---|
| TX Sector Combination Index | 6 | 19 | Indicates the TX Sector Combination and the Corresponding RX AWVs to be used in the following SU-MIMO Transmission. Reserved if the SISO/MIMO Field is Set to 0 or the SU/MU MIMO Field is Set to 1. This Field is Set to 63 to Indicate that Quasi-omni AWVs are used for the RX Antennas Reported in the SISO Phase of SU-MIMO Beamforming Training by the Initiator and Responder |
| Channel Measurement Requested | 1 | 20 | This Field is Reserved for CT_TYPE RTS or CTS2Self. This Field is Reserved if One of the Beamforming Training, IsInitiatorTXSS, or IsResponderTXSS Fields of the Grant Frame is Set to 0. If Set to 1, Indicates Channel Measurement Feedback is Requested as Part of MIMO BF Training Feedback in SISO Phase. Otherwise, it is Set to 0 |
| Number of Taps Requested | 2 | 22 | This Field is Reserved for CT_TYPE RTS or CTS2Self. This Field is Reserved if One of the Beamforming Training, IsInitiatorTXSS, or IsResponderTXSS Fields of the Grant Frame is Set to 0. Otherwise, the Field is Set to the Number of Taps Requested in each Channel Measurement |
| TXSS Channel Number | 3 | 25 | This Field is Reserved for CT_TYPE RTS or CTS2Self. This Field is Reserved if One of the Beamforming Training, IsInitiatorTXSS, or IsResponderTXSS Fields of the Grant Frame is Set to 0. This Field is Reserved if BW Field Indicates a Single 2.16 GHz Channel Otherwise, the Field is Set to the Channel Number for the TXSS |
| No-rep TXSS | 1 | 26 | This Field is Reserved for CT_TYPE RTS or CTS2Self. This Field is Reserved if One of the Beamforming Training, IsInitiatorTXSS, or IsResponderTXSS Fields of the Grant Frame is Set to 0. If Set to 1, Initiator and Responder TXSS are Performed as if the last Negotiated Number of RX DMG Antennas Fields from Initiator and Responder are Equal to 1 |

FIG. 11

| Applicable Frame (Sub-)Types | Bits 0-3 | Bit 4 | Bits 5-6 | Bit 7 | Bit 8 | Bit 9 | Bits 10-13 | Bit 14 | Bit 15 |
|---|---|---|---|---|---|---|---|---|---|
| QoS Data | TID 1805 | EOSP 1810 | Ack Policy 1815 | A-MSDU Present 1820 | A-MSDU Type 1825 | RDG/More PPDU 1830 | Buffered AC 1835 | Reserved 1840 | AC Constraint 1845 |
| QoS Null | TID 1805 | EOSP 1810 | Ack Policy 1815 | Reserved 1855 | Reserved 1860 | RDG/More PPDU 1830 | Buffered AC 1835 | Reserved 1840 | AC Constraint 1845 |

1800 — QoS Data row
1850 — QoS Null row

FIG. 18

| 2205 | 2210 | 2215 | 2220 | 2225 | 2230 | 2235 | 2240 | 2245 |
|---|---|---|---|---|---|---|---|---|
| Packet Type | Direction | Best rx RF Chain | Source AID | Destination AID | CDOWN | RF Chain ID | Short SSW Feedback | FCS |
| 2 | 1 | 1 | 8 | 8 | 11 | 2 | 11 | 4 |

2200 ⎯ Number of Bits

FIG. 22

| Bit Range | B0 B4 | B5 | B6 | B7 | B8 | B9 | B10 B11 | B16 B17 | B24 B25 B26 | B27 | B29 B31 |
|---|---|---|---|---|---|---|---|---|---|---|---|
| | L-RX | TX-TRN-REQ | MID-REQ | BC-REQ | MID-Grant | BC-Grant | Chan-FBCK-CAP | TX Sector ID | Other_AID | TX Antenna ID | Additional Feedback Requested | Best rx Antenna | Reserved |
| Number of Bits | 5 | 1 | 1 | 1 | 1 | 1 | 1 | 6 | 8 | 2 | 1 | 1 | 3 |
| | 2305 | 2310 | 2315 | 2320 | 2325 | 2330 | 2335 | 2340 | 2345 | 2350 | 2355 | 2360 | 2365 |

| Capability | Capabilities ID |
|---|---|
| Beamforming | 0 |
| Multi-BF | 1 |
| Antenna Polarization Capability | 2 |
| PHY Capability | 3 |
| Supported Channels | 4 |
| MIMO | 5 |

# MULTI CHANNEL MULTIPLE INPUT MULTIPLE OUTPUT BEAMFORMING TRAINING IN MILLIMETER WAVE SYSTEMS

This application is the U.S. National Stage, under 35 U.S.C. § 371, of International Application No. PCT/US2018/041074 filed Jul. 6, 2018, which claims the benefit of U.S. Provisional Application No. 62/529,271, filed Jul. 6, 2017 and U.S. Provisional Application No. 62/553,054, filed Aug. 31, 2017, the content of which are hereby incorporated by reference herein.

BACKGROUND

Beam refinement is a process where a wireless station (STA) can improve its antenna configuration (e.g., antenna weight vectors) for transmission and/or reception.

SUMMARY

Systems, methods, and devices for beamforming (BF) training are disclosed. In some examples, a receiver is configured to receive sector sweep (SSW) training frames from an initiator device that each indicate an antenna sector of the initiator device. A transmitter is configured to transmit sector sweep (SSW) training frames to the initiator device that indicate a best received antenna sector of the initiator device. The receiver receives a sector sweep feedback (SSW FB) frame from the initiator device, and the transmitter transmits transmit a sector sweep acknowledgement (SSW ACK) frame to the initiator device that indicates an antenna sector of the initiator device that is different from the antenna sector indicated by the SSW FB frame, if the SSW FB frame was best received by an antenna not corresponding to the best received antenna sector of the initiator device.

BRIEF DESCRIPTION OF THE DRAWINGS

A more detailed understanding may be had from the following description, given by way of example in conjunction with the accompanying drawings wherein:

FIG. 11 is a table illustrating example control trailer fields;

FIG. 18 is a bitmap illustrating an example control field for frames transmitted within a directional multi-gigabit (DMG) Physical Layer Convergence Procedure (PLCP) Protocol Data Unit (PPDU);

FIG. 22 is a bitmap illustrating an example short SSW packet format;

FIG. 23 is a bitmap illustrating an example BRP Request field format;

DETAILED DESCRIPTION

Figure 1A:
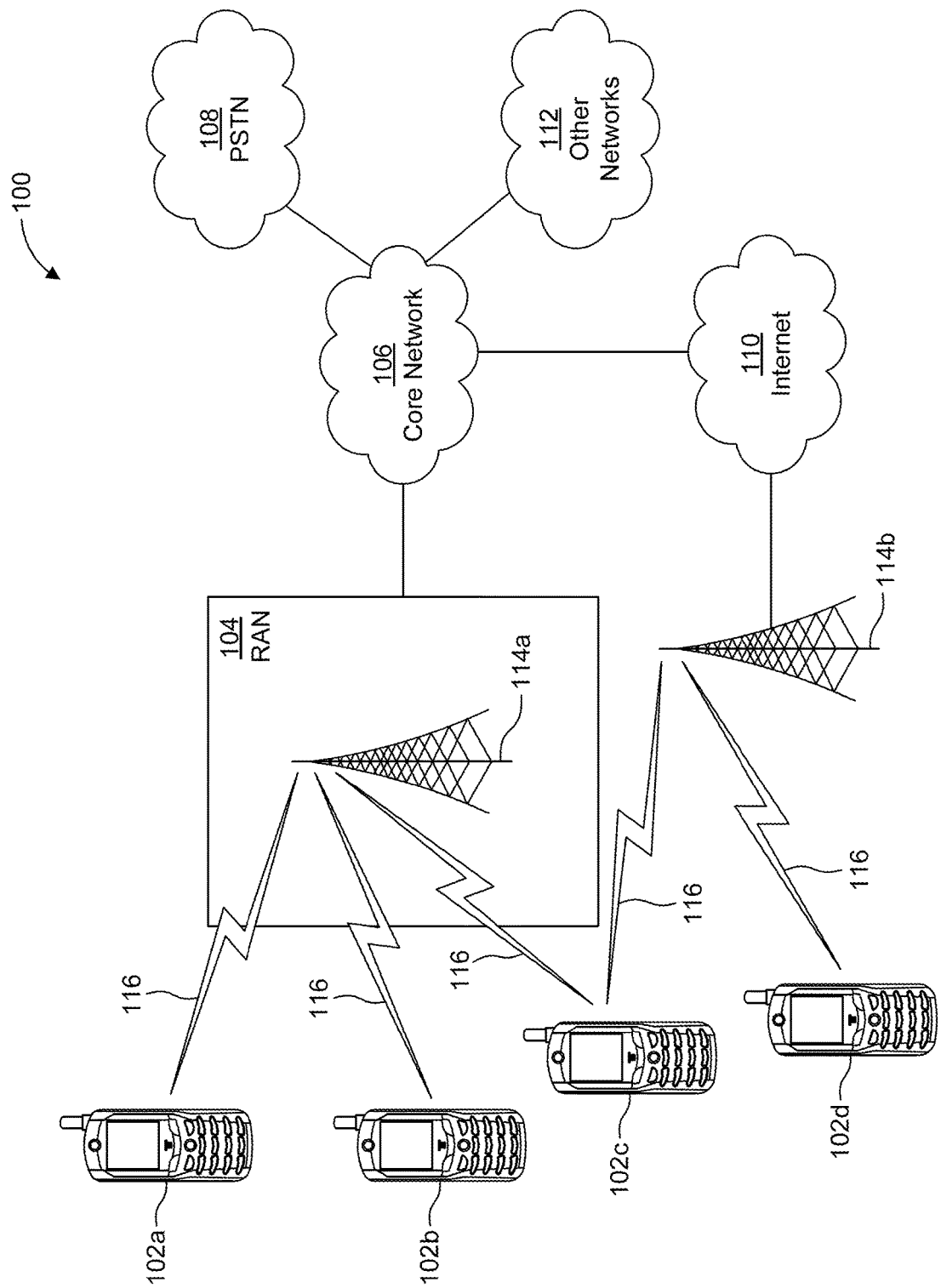
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
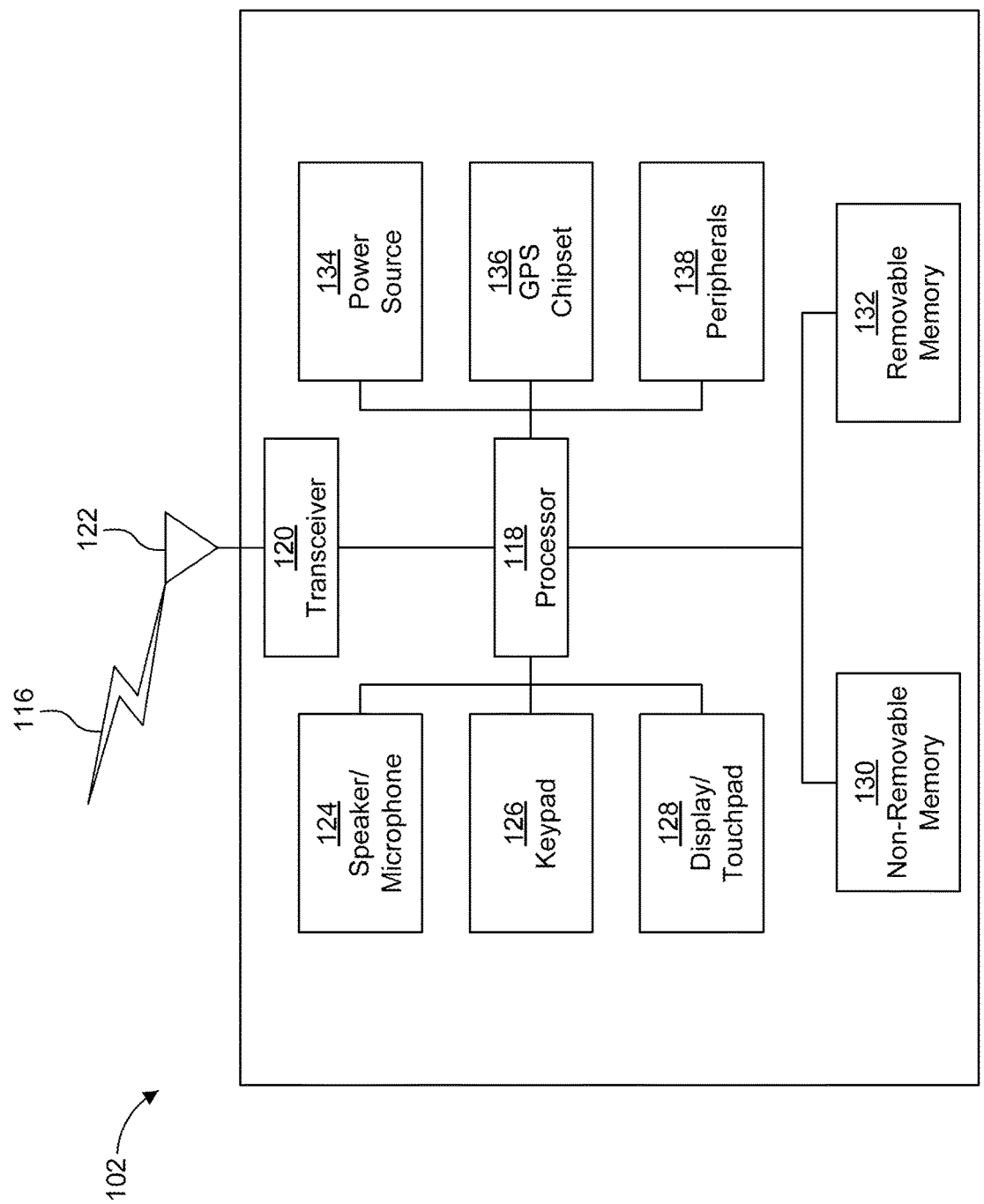
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
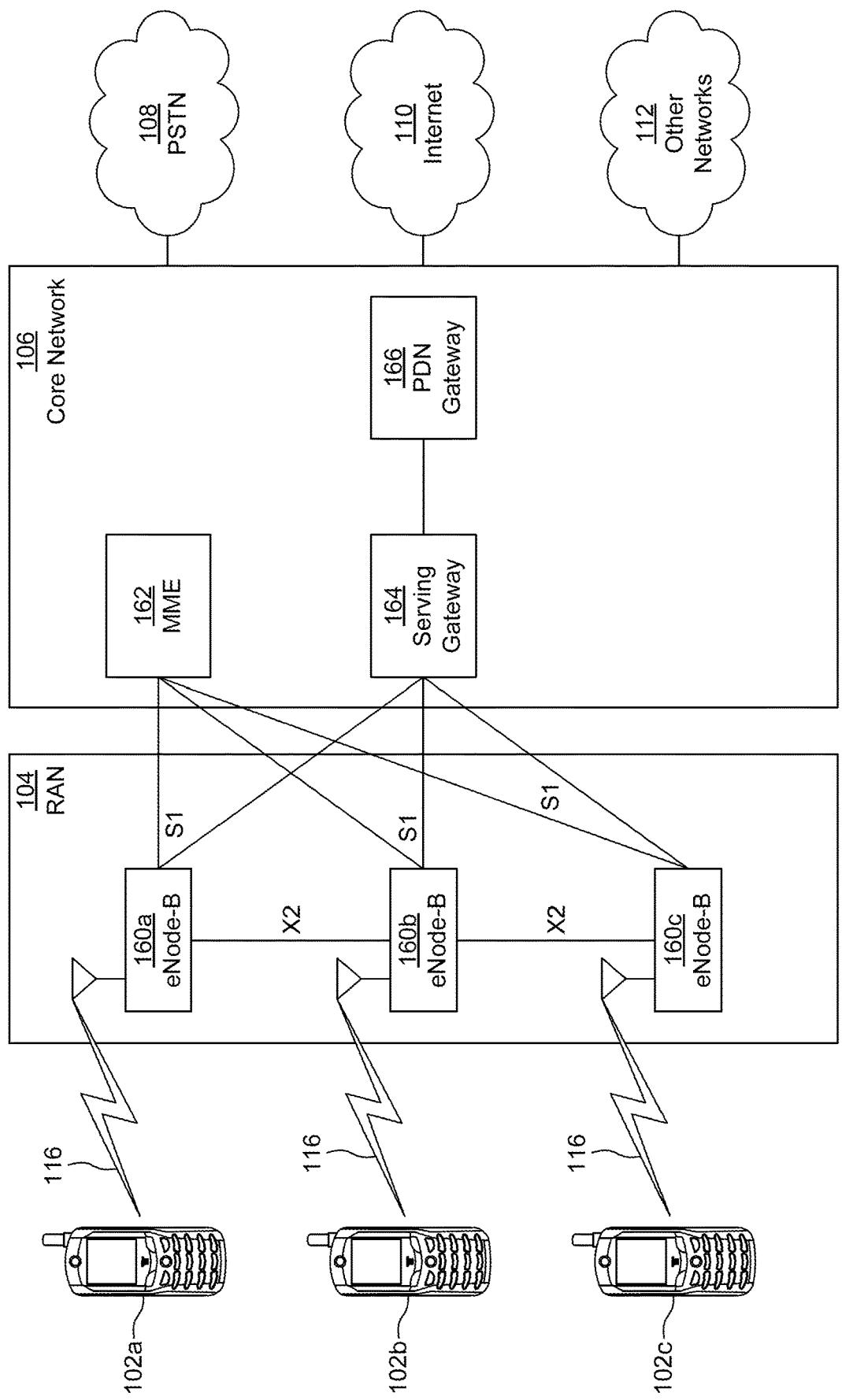
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
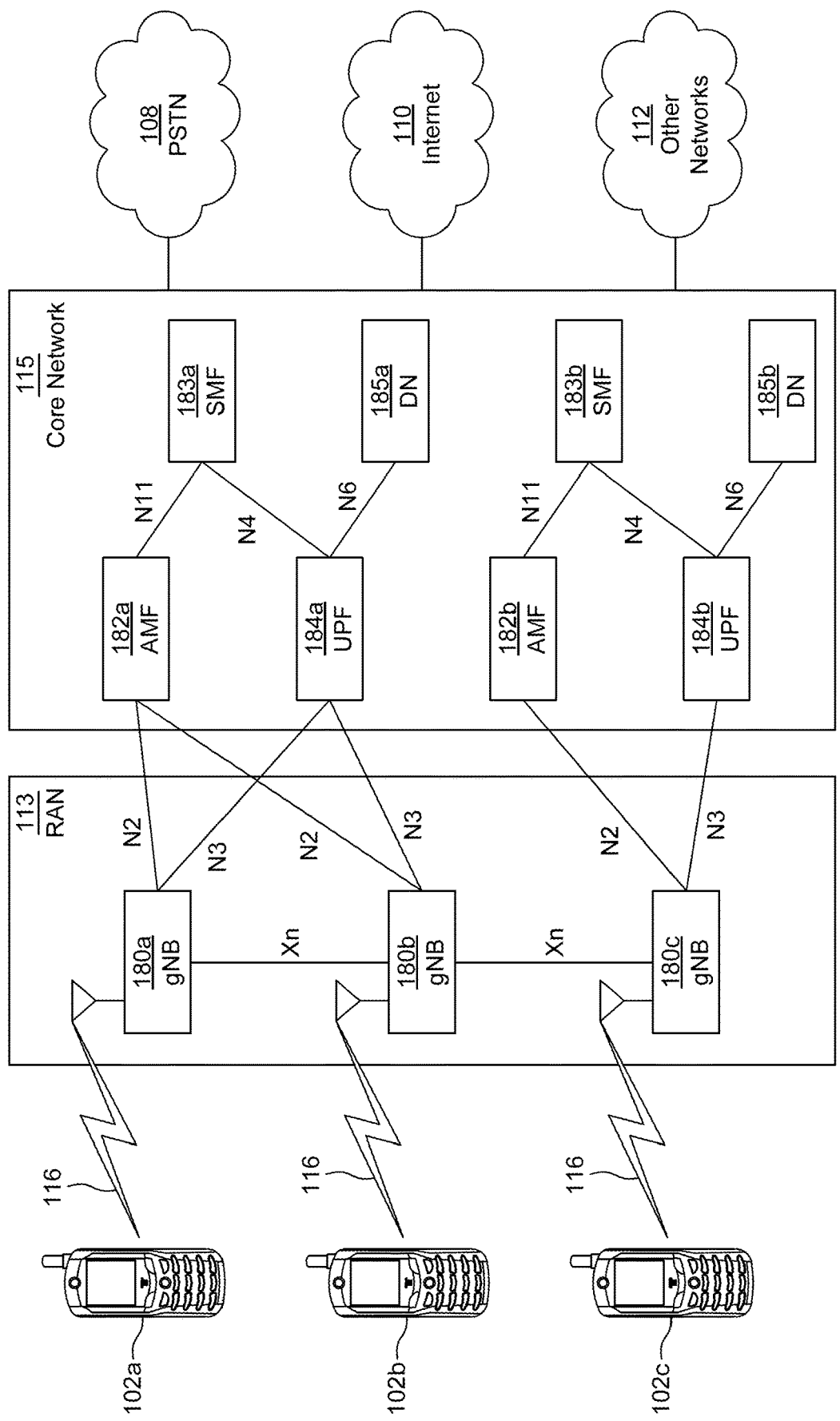
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology.

For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented and/or deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented and/or deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A WLAN operating in Infrastructure Basic Service Set (BSS) mode can include an Access Point (AP/PCP) for the BSS and one or more stations (STAs) associated with the AP/PCP. The AP/PCP typically has access to or an interface with a Distribution System (DS) or another type of wired/wireless network that carries traffic in and out of the BSS. Traffic to STAs that originates from outside the BSS can arrive through the AP/PCP and can be delivered to the STAs. Traffic originating from STAs to destinations outside the BSS can be sent to the AP/PCP to be delivered to the respective destinations. Traffic between STAs within the BSS may also be sent through the AP/PCP where the source station (STA) sends traffic to the AP/PCP and the AP/PCP delivers the traffic to the destination STA. Such traffic between STAs within a BSS can be referred to as peer-to-peer traffic. Peer-to-peer traffic may also be sent directly between the source and destination STAs with a direct link setup (DLS) using an 802.11e DLS or an 802.11z tunneled DLS (TDLS). A WLAN operating in an Independent BSS (IBSS) mode does not include a AP/PCP, and STAs can communicate directly with each other. This mode of communication can be referred to as an "ad-hoc" mode of communication.

Using the 802.11ac infrastructure mode of operation, an AP/PCP may transmit a beacon on a fixed channel, usually the primary channel. This channel may be 20 MHz wide, and may be the operating channel of the BSS. This channel may also be used by the STAs to establish a connection with the AP/PCP. The fundamental channel access mechanism in an 802.11 system is Carrier Sense Multiple Access with Collision Avoidance (CSMA/CA). In this mode of operation, every STA, including the AP/PCP, will sense the primary channel. If a STA detects that the channel is busy, the STA backs off. Hence only one STA may transmit at any given time in a given BSS.

802.11ad is an amendment to the WLAN standard, which specifies the MAC and physical layer (PHY) layers the 60 GHz band.

802.11ad supports data rates up to 7 Gbits/s, supports three different modulation modes, including Control PHY with single carrier and spread spectrum, Single Carrier PHY, and orthogonal frequency division multiplexed (OFDM) PHY, and uses the 60 GHz unlicensed band, which is available globally. At 60 GHz, the wavelength is 5 mm, which makes compact and antenna or antenna arrays possible. Such antennas can create narrow RF beams at both transmitter and receiver, which effectively increase the coverage range and reduce the interference.

Figure 2:
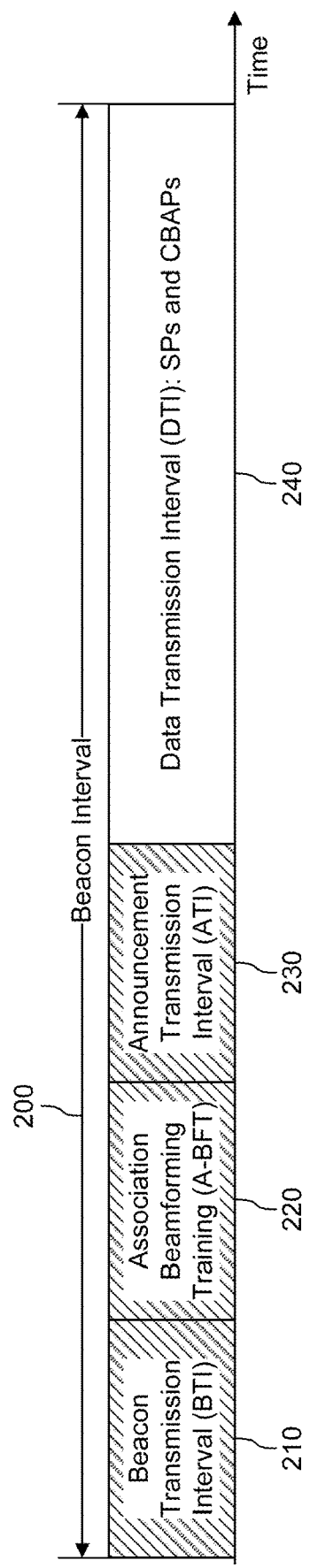
FIG. 2 is a signal diagram illustrating an example Institute of Electrical and Electronics Engineers (IEEE) 802.11ad Beacon Interval.

FIG. 2 is a signal diagram illustrating an example IEEE 802.11ad, beacon interval (BI) 200 which includes a Beacon Header Interval (BHI) 210 and Data Transmission Interval (DTI). The BHI includes a Beacon Transmission Interval (BTI) 210, Association Beamforming Training (A-BFT) interval 220, and Announcement Transmission Interval (ATI) 230. The BTI 210 includes multiple beacon frames, each transmitted by the PCP/AP on a different sector of its antenna or antennas to cover all possible transmission directions. The BTI 210 can be used for network announcement and beamforming training of the PCP/AP's antenna sectors. Stations train their antenna sectors for communication with the PCP/AP during A-BFT. The PCP/AP exchanges management information with associated and beam-trained stations during the ATI.

BI 200 also includes a data transmission interval (DTI) 240. DTI 240 includes one or more contention-based access periods (CBAPs) and/or scheduled service periods (SPs) where stations exchange data frames. In each CBAP, multiple stations can contend for the channel according to the IEEE 802.11 enhanced distributed coordination function (EDCF). A service period (SP) can be assigned in a DTI for communication between a dedicated pair of nodes as a contention free period.

The frame structure of 802.11ad facilitates a mechanism for beamforming training (discovery and tracking). The beamforming training protocol can include two components: a sector level sweep (SLS) procedure, and a beam refinement protocol (BRP) procedure. The SLS procedure can be used for transmit beamforming training; the BRP procedure can be used for receive beamforming training, and iterative refinement of both the transmit and receive beams.

Figure 3:
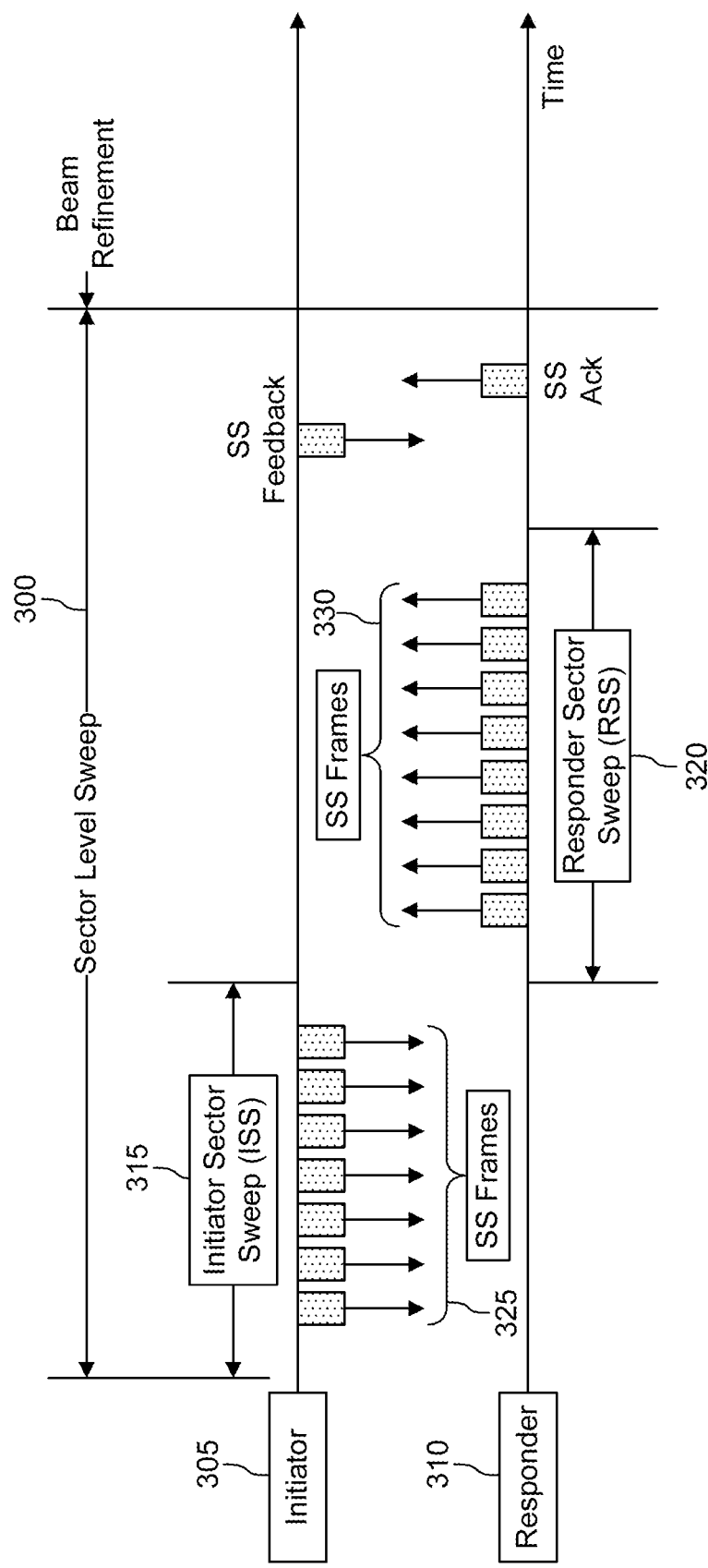
FIG. 3 is a signal diagram illustrating an exemplary sector level sweep (SLS) training procedure.

FIG. 3 is a signal diagram illustrating an example SLS training procedure 300 between an initiator 305 and a responder 310. SLS training procedure 300 includes an Initiator Sector Sweep (ISS) 315 and a Responder Sector Sweep (RSS) 320. During ISS 315, initiator 305 transmits sector sweep (SS) frames 325 to responder 310, and during RSS 320, responder 310 transmits SS frames 330 to initiator 305. The SS frames 325 and 330 may be implemented using a Beacon frame or an SSW frame. If a Beacon frame is used for SLS training, the AP/PCP (the initiator in this case) repeats the Beacon frame over multiple beams/sectors within each Beacon interval (BI) and multiple STAs (the responders in this case) can perform BF training simultaneously. However, due to the size of Beacon frames, it is not guaranteed that the AP/PCP can sweep all the sectors/beams within one BI. Thus a STA may need to wait multiple BIs to complete Initial Sector Sweep (ISS) training, and latency may be an issue. A SSW frame may be utilized for point to point BF training, and may be transmitted using control PHY.

Figure 4:
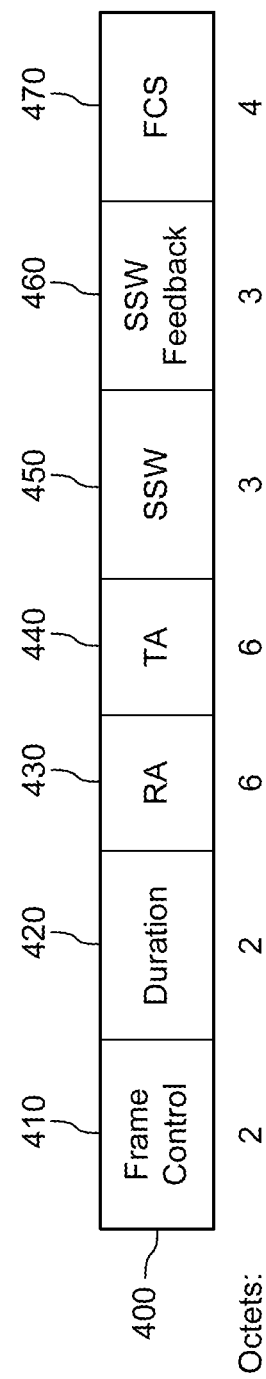
FIG. 4 is a bitmap illustrating an example sector sweep (SSW) frame format by octet.
Figure 5:
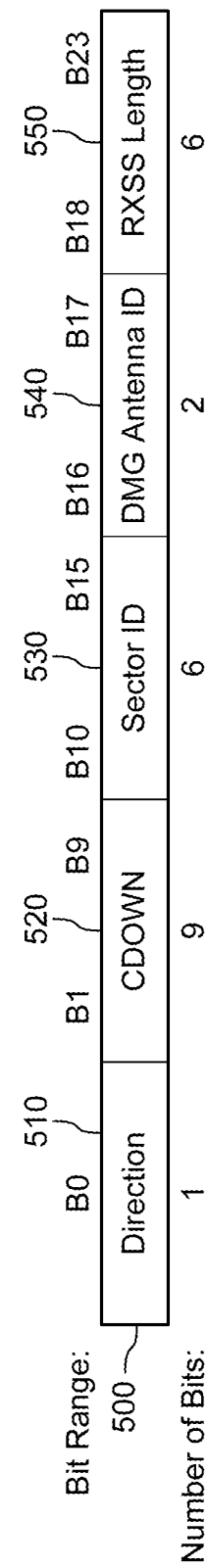
FIG. 5 is a bitmap illustrating an example SSW field of the SSW frame by bits.

FIG. 4 is a bitmap illustrating an example SSW frame format 400 by octet. SSW frame format 400 includes a Frame Control field 410, Duration field 420, RA field 430, TA field 440, SSW field 450, SSW Feedback field 460, and FCS 470. FIG. 5 is a bitmap illustrating an example SSW field format 500 by bits. SSW field format 500 includes Direction field 510, countdown (CDOWN) field 520, Sector ID field 530, DMG Antenna ID field 540, and RXSS Length field 550. SSW field format 500 may be used for SSW field 450 of the SSW frame format 400.

Figure 6:
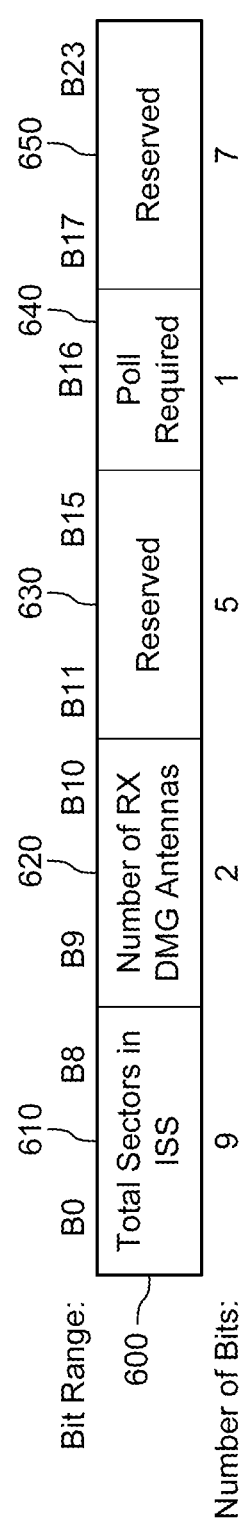
FIG. 6 is a bitmap illustrating an example SSW Feedback field of the SSW frame by bits, where the SSW frame is transmitted as part of an initial sector sweep (ISS)

FIG. 6 is a bitmap illustrating an example SSW Feedback field format 600 of the SSW frame by bits, where the SSW frame is transmitted as part of an ISS. SSW Feedback field format 600 includes Total Sectors in ISS field 610, Number of RX DMG Antennas field 620, Reserved field 630, Poll Required field 640, and Reserved field 650. SSW Feedback field format 600 may be used for SSW feedback field 460 of SSW frame format 400.

Figure 7:
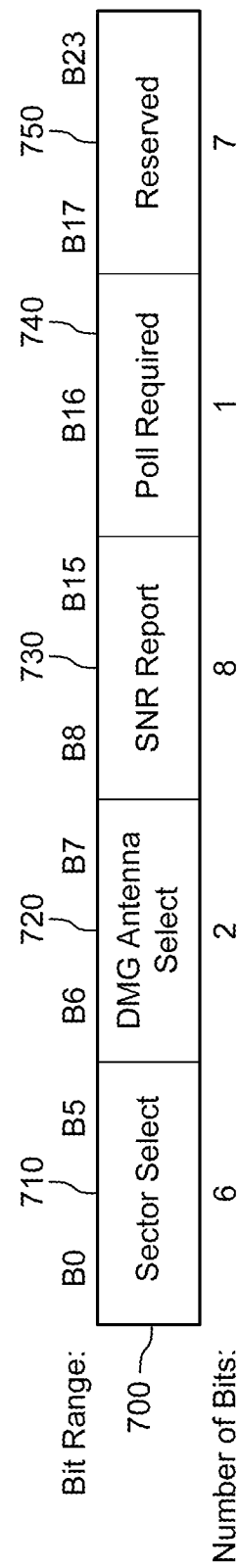
FIG. 7 is a bitmap illustrating an example SSW Feedback field of the SSW frame by bits, where the SSW frame not transmitted as part of an ISS.

FIG. 7 is a bitmap illustrating an example SSW Feedback field format 700 of the SSW frame by bits, where the SSW frame is not transmitted as part of an ISS. SSW Feedback field format 700 includes Sector Select field 710, DMG Antenna Select field 720, SNR Report field 730, Poll Required field 740, and Reserved field 750. SSW Feedback field format 700 may be used for SSW feedback field 460 of SSW frame format 400.

Figure 8:
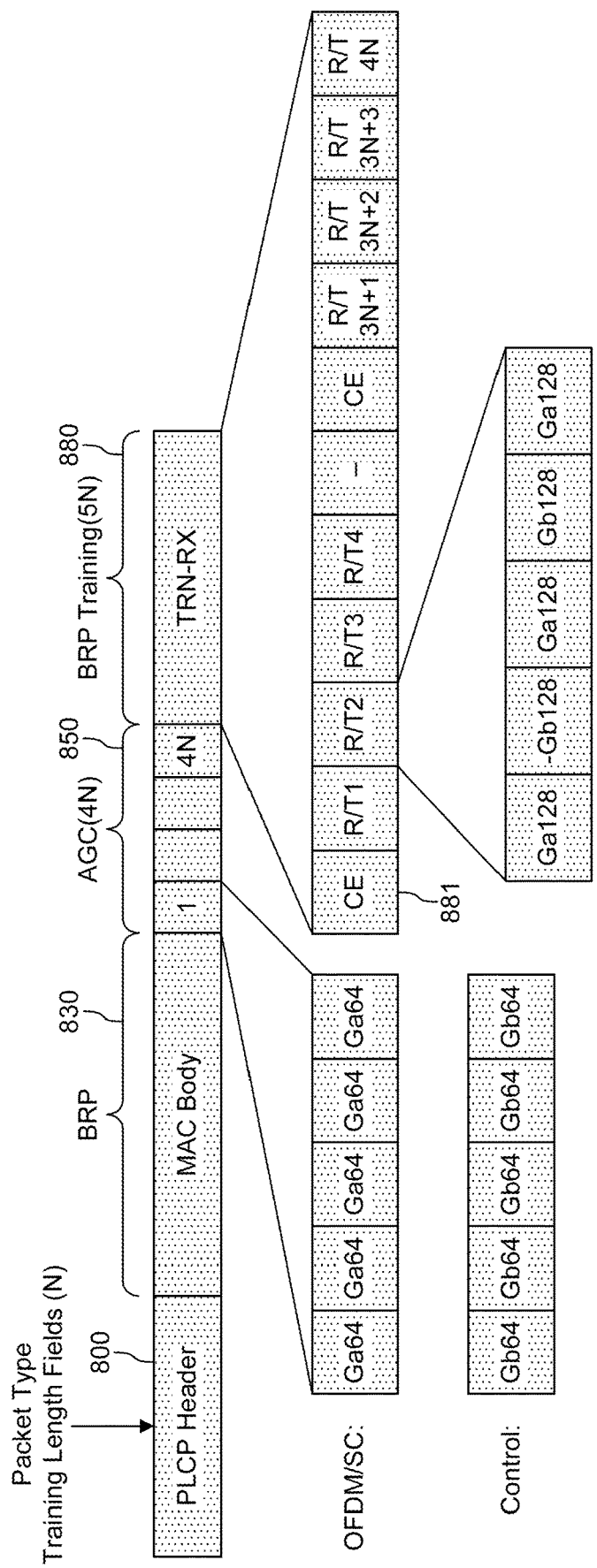
FIG. 8 is a block diagram illustrating a Directional Multi-Gigabit (DMG) Physical Layer Convergence Procedure (PLCP) Protocol Data Unit (PPDU) followed by a training field containing an Automatic Gain Control (AGC) field and a transmitter or receiver training field.

Beam refinement is a process where a STA can improve its antenna configuration (e.g., antenna weight vectors) for transmission and/or reception. In an example beam refinement procedure, BRP packets are used to train the receiver and transmitter antenna of the STA. There can be two types of BRP packets: BRP-RX packets and BRP-TX packets. A BRP packet may be carried by a Directional Multi-Gigabit (DMG) Physical Layer Convergence Procedure (PLCP) Protocol Data Unit (PPDU) followed by a training field containing an Automatic Gain Control (AGC) field and a transmitter or receiver training field. FIG. 8 is a block diagram illustrating an example DMG PLCP PPDU 800, followed by a BRP MAC body 830, followed by an AGC 850, followed by a BRP receive and/or transmit training (TRN-R/T) field 880. N represents a Training Length given in the header field 800, which indicates that the AGC field 850 has 4N subfields and that TRN-R/T field 880 has 5N subfields. Each subfield of the AGC field 850 may include 5 Golay sequences, and each Golay sequence may have a size of 64. Each subfield of the TRN-R/T field 880 may include a channel estimation (CE) subfield or 5 Golay sequences, and where each Golay sequence may have a size 128. The CE subfield 881 may be the same as or similar to a preamble described in the previous section. All subfields in the TRN-R/T field 880 are transmitted using rotated $\pi/2$-BPSK modulation. BRP MAC body 830 is an Action No ACK frame, which includes the following fields: Category; Unprotected DMG Action; Dialog Token; BRP Request field; DMG Beam Refinement element; and fields for Channel Measurement Feedback element 1 through Channel Measurement Feedback element k.

Figure 9:
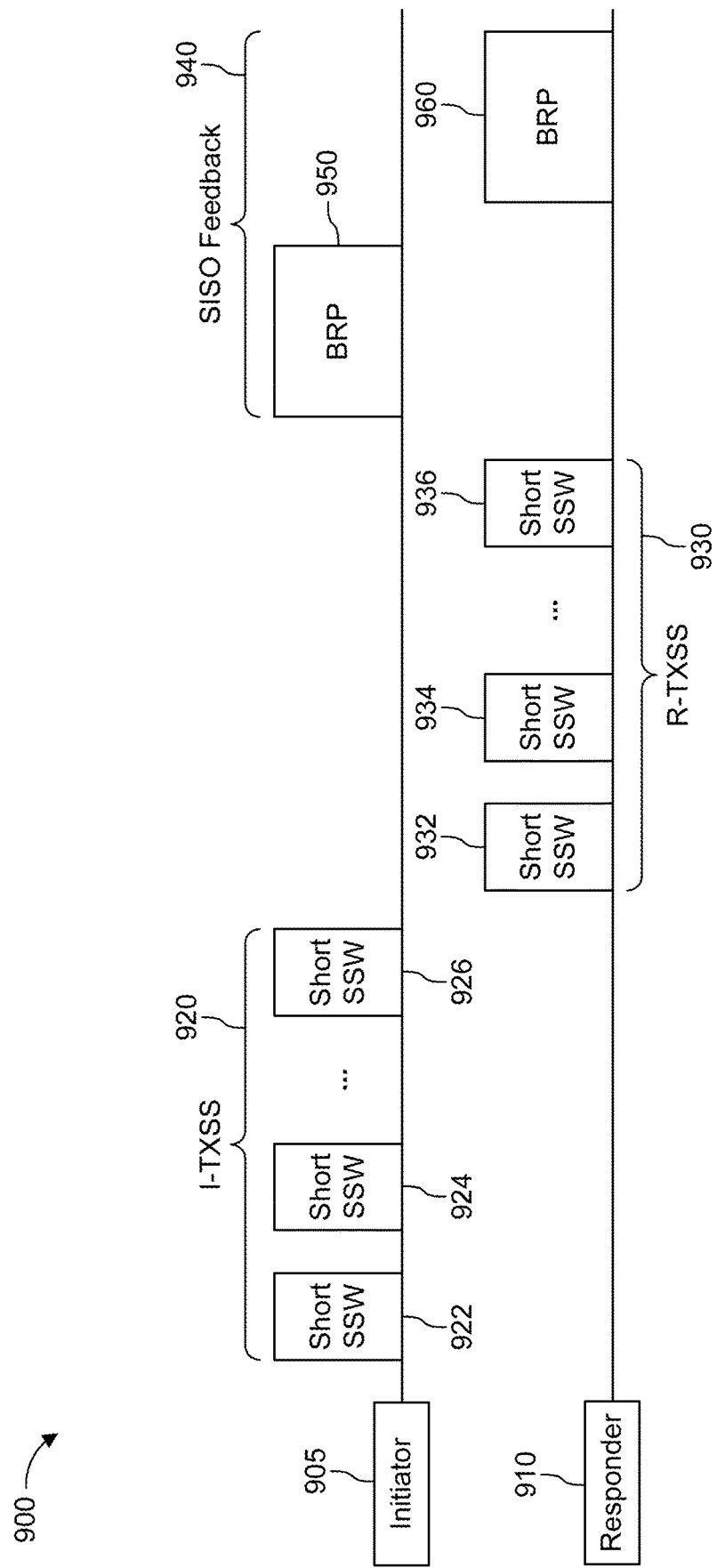
FIG. 9 is a signal diagram illustrating a SISO phase in a single-user MIMO (SU-MIMO) BF training procedure.

FIG. 9 is a signal diagram which illustrates an example SU-MIMO beamforming training procedure 900 between an initiator 905 and responder 910. In an I-TXSS phase 920, initiator 905 transmits short SSW frames 922, 924, . . . , 926 to responder 910. In a R-TXSS phase 930, responder 910 transmits short SSW frames 932, 934, . . . , 936 to initiator 905. In a SISO Feedback phase 940, initiator 905 transmits a BRP frame 950, and responder 910 transmits a BRP frame 960. BRP frame 950 includes a CDOWN field which indicates the best TX sector of responder 910 based on the RX sector of initiator 905 which best received SSW frames 932, 934, . . . , 936. BRP frame 960 includes a CDOWN field which indicates the best TX sector of initiator 905 based on the RX sector of responder 910 which best received SSW frames 922, 924, . . . , 926.

A first issue which can arise in multi-user MIMO (MU-MIMO) beamforming training is that BRP frames may be used to feedback channel information for sector level sweep, where a SSW or short SSW frame may be used as a beamforming training frame. This issue can be referred to as the BRP feedback without setup issue.

In some examples, beam refinement may be a request/response based process. In that case, the SSW or short SSW frame may have no ability (e.g., no available field) to signal what feedback type is necessary or selected. Existing schemes require feedback of countdown (CDOWN) values and corresponding signal to noise ratios (SNRs). Here, CDOWN is a subfield in several beamforming training frames, which provides a countdown number such that STAs can determine how many training frames are left.

Feedback of CDOWN values and SNRs may not provide the best feedback in terms of beamforming training overhead and/or MIMO throughput. Depending on implementation, channel state information (CSI), which may be used to obtain the full/partial MIMO channel, may be used for feedback. In that case, a later MIMO training phase may be reduced (e.g., truncated) or not be needed.

A second issue which can arise in MU-MIMO beamforming training where a short SSW frame is used for enhanced directional multi-gigabit (EDMG) sector level training, e.g., as defined in IEEE 802.11ay. This issue can be referred to as the short SSW frame for multi-channel sector level training issue. The existing short SSW frame format, which is transmitted using a control mode PPDU, does not carry channel bandwidth information. However, the short SSW frame may be used for multi-channel sector level training. Accordingly, a mechanism may be used to provide multi-channel information.

A third issue which can arise in MU-MIMO beamforming training where in some implementations, MU-MIMO user grouping may need to be performed before MU-MIMO BF training procedures defined in DTI since an AP/PCP may be required to transmit an EDMG Group ID Set element prior to performing the MU-MIMO beamforming protocol. This issue can be referred to as the MU-MIMO user grouping issue. In this way, the MU-MIMO grouping may be performed purely based on SLS performed in BTI, where the best beam/sector may be fed back from STA to AP by SSW or short SSW frame. However, the information regarding best beam/sector may not be sufficient to minimize the inter-user interference between MU-MIMO STAs.

A fourth issue which can arise in MU-MIMO beamforming training is that in some implementations, a quality of service (QoS) Null frame may be sent by a responder if it is not ready to respond to a BRP frame immediately. This issue can be referred to as the inter-frame spacing (IFS) negotiation for BRP feedback issue. However, a present QoS Null frame may be transmitted over a single channel. Accordingly, an extension may be selected to support multi-channel BRP training.

A QoS Null frame can be repeated and transmitted before the BRP frame. In some implementations, if a BRP feedback frame is ready to transmit during a QoS Null frame transmission, the responder may need to wait for the completion of the QoS Null frame before transmitting the BRP frame. In some implementations, it may not be efficient to wait for completion of the QoS Null Frame.

A fifth issue which can arise in MU-MIMO beamforming training relates to the BRP TXSS procedure. BRP frames may be used for sector level sweep, and a BRP TXSS procedure may be defined for this purpose. However, in a BRP TXSS, which includes both initiator TXSS and responder TXSS, there is no mechanism to support more efficient training with antenna reciprocity. This can be referred to as the antenna reciprocity issue.

Figure 32:
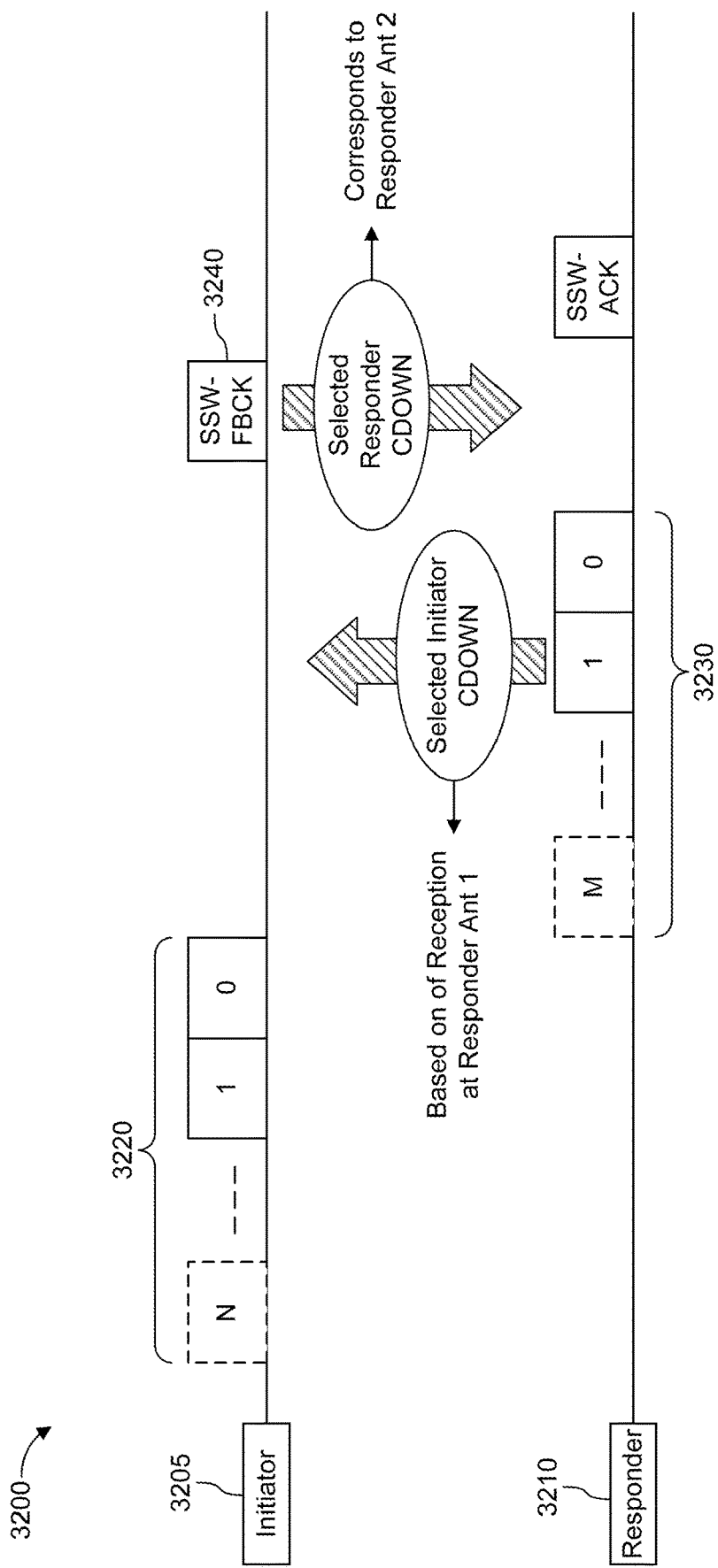
FIG. 32 is a signal diagram illustrating an example SLS procedure with a receive antenna indication.

A sixth issue which can arise in MU-MIMO beamforming training relates to SLS procedures. FIG. 32 is a signal diagram illustrating an example SLS procedure 3200 which includes a receive antenna indication. In this example, an initiator 3205 transmits SSW frames to responder 3210 during SSW 3220. Responder 3210 transmits SSW frames to initiator 3230 during SSW 3230. Responder 3210 selects the best Tx sector x of initiator 3205 based on its Rx antenna and/or RF chain 1. Responder 3210 indicates this sector to initiator 3205 in a CDOWN field in the frames of SSW 3230.

However, the initiator 3205 selects the best Tx sector y of responders antenna 2 based on its RX antenna and/or RF chain 2. Initiator 3205 indicates this sector to responder 3210 in a CDOWN field in the SSW-FBCK frame 3240. The CDOWN field carried in the SSW frames and SSW-FBCK frame 3240 do not indicate which receive antenna was used to select the transmit sector. This may result in a mismatch between TX and RX antennas and cause the responder to have different antennas for transmitting and receiving. This can be referred to as the antenna mismatch issue.

The responder 3210 may, in the SSW ACK frame, indicate a best Tx sector z of initiator for responder's Rx antenna 2. However, if SSW ACK is lost or encounters a collision, the initiator may repeat the transmission of SSW Feedback using Tx sector x, and this Tx sector may not be heard by the responder's antenna 2.

A MIMO training and setup approach may be used to address the BRP feedback without setup issue and/or the short SSW frame for multi-channel sector level training issue.

In some implementations, assuming the EDMG STA can operate multiple receive (Rx) RF chains at the same time, the beamforming (BF) control field in an extended schedule element of a Grant or Grant ACK frame may be extended to convey a training setting for the allocation. For example, the BF control field may be extended to indicate that SLS will be performed as the single-input single-output (SISO) phase of the MIMO training.

In a first example, where BF training is between two or more non AP STAs; and set up through BTI, an AP may use a legacy or enhanced Extended Schedule Element in a Beacon frame to carry the MIMO multi-channel BF training information, and may assign a service period contention based access period (SP/CBAP) to two (or more) non AP STAs. The AP may determine and may indicate that SP/CBAP may be used for MIMO and/or multi-channel BF training. The Extended Schedule Element may carry the type of the BF training, the feedback request and/or other related information. The non AP STAs may use this setting to begin a SLS in the SP.

In a second example, where BF training is between AP and non AP STAs over multiple channels and set up through BTI, an AP may use a legacy or enhanced Extended Schedule Element in a Beacon frame to carry the MIMO multi-channel BF training information, and may assign a SP/CBAP for communications between the AP and one or more non-AP STAs over one or more channels (e.g., including non-primary channels on which BF training may not be performed during BTI). The AP may determine and may indicate that the SP/CBAP may be used for MIMO and/or multi-channel BF training. The Extended Schedule Element may carry the type of BF training, the feedback request and/or other related information may be carried. The non AP STAs may use this setting for SLS in the SP.

In a third example, where BF training is between two or more non AP STAs; and set up through an ATI, an AP may use a legacy or enhanced Extended Schedule Element and/or Grant frame in the ATI to carry the MIMO multi-channel BF training information, and may assign a SP/CBAP to two (or more) non AP STAs. It is noted that there may be multiple transmissions during the ATI. For example, the AP may transmit to a first STA using a trained directional transmission and the STA may respond. The AP may thereafter transmit to the second STA using a trained directional transmission and the STA may response. The AP may determine and may indicate that the SP/CBAP may be used for MIMO and/or multi-channel BF training. The Extended Schedule Element and/or Grant frame in ATI may include the type of the BF training, the feedback request and/or other related information. The non AP STAs may use this setting to begin a SLS in the SP.

In a fourth example, where BF training is between AP and non AP STAs over multiple channels and set up through ATI, an AP may use a legacy or enhanced Extended Schedule Element and/or a Grant frame in an ATI to carry the MIMO multi-channel BF training information, and may assign a SP/CBAP for communications between the AP and one or more non-AP STAs over one or more channels (including non-primary channels on which BF training may not be performed during BTI). The transmission may be directional, using the BF sectors/beams trained in BTI over primary channel. The AP may determine and may indicate that the SP/CBAP may be used for MIMO and/or multi-channel BF training. The Extended Schedule Element and/or the Grant frame in the ATI may carry the type of the BF training, the feedback request and other related information. The non AP STAs may use this setting for SLS in the SP.

In a fifth example, where BF training is between two or more non AP STAs; and set up through DTI, the initiator of a SP/CBAP may use a Grant frame at the beginning of the SP/CBAP to carry the MIMO multi-channel BF training information. It is noted that in the case of a CBAP, a STA may acquire the channel and become the initiator through contention, while in the case of a SP, the STA may be assigned as an initiator. The responder may reply with a Grant ACK frame to confirm the reception of the setting. The initiator may thereafter begin SLS training. It is noted that in this procedure, the initiator may determine and may indicate that the SP/CBAP may be used for MIMO and/or multi-channel BF training. The Grant frame may carry the type of the BF training, the feedback request and other related information. Without excluding any other combinations, it is noted that the fifth example may be combined with the first example, where the MIMO multi-channel BF training setup may be performed in both BTI and DTI. Without excluding any other combinations, it is also noted that the fifth example may be combined with the third example, where the MIMO multi-channel BF training setup may be performed in both ATI and DTI.

In a sixth example, where BF training is between AP and non AP STAs over multiple channels and set up through DTI, an AP may be the initiator of a SP/CBAP. In the case of a CBAP, the AP may acquire the channel through contention, while in the case of a SP, the AP may be assigned as an initiator. The AP may use a Grant frame in the SP/CBAP to carry the MIMO multi-channel BF training information between the AP and one or more non-AP STAs over one or more channels (e.g., including non-primary channels on which BF training may not be performed during BTI). The transmission of the Grant and Grant ACK frames may be directional using the BF sectors/beams trained in BTI over primary channel or duplicate mode over multiple channels. The AP may decide and may indicate that the SP may be used for MIMO and/or multi-channel BF training. The Grant/Grant ACK frames may carry the type of the BF training, the feedback request and other related information. The non AP STAs may use this setting for SLS in the SP/CBAP. Without excluding any other combinations, it is noted that the sixth example may be combined with the second example, where the MIMO multi-channel BF training setup may be performed in both BTI and DTI. Without excluding any other combinations, it is also noted that the sixth example may be combined with the fourth example, where the MIMO multi-channel BF training setup may be performed in both ATI and DTI.

If the AP/PCP requests channel measurement feedback using a control trailer of a grant frame, an Extended Schedule element, or an EDMG Extended Schedule element, the BRP frame in the SISO feedback subphase of SU-MIMO BF training procedure may contain a list of Channel Measurements. The responder may send a BRP frame to the initiator a short interframe space (SIFS) following the reception of the BRP frame from the initiator, which may contain a list of CDOWN values and SNRs of the transmit sectors received during the last initiator transmit sector sweep (TXSS). If the AP/PCP requests channel measurement feedback using a control trailer of a grant frame, an Extended Schedule element, or an EDMG Extended Schedule element, the BRP frame may also contain a list of Channel Measurements. If a channel number/index used for the TXSS was carried by a grant frame, an Extended Schedule Element, or an EDMG Extended Schedule Element, the feedback may be based on a measurement on the channel indicated by the channel number/index.

If the SISO feedback subphase of SU-MIMO BF training procedure provides channel measurement feedback, the MIMO subphase may be skipped. If No-rep TXSS field is set to 1 in a grant frame, Extended Schedule Element, or EDMG Extended Schedule Element, The initiator TXSS and the responder TXSS may be performed as if the last negotiated Number of RX DMG Antenna fields are equal to 1 from both the initiator and the responder.

Figure 10:
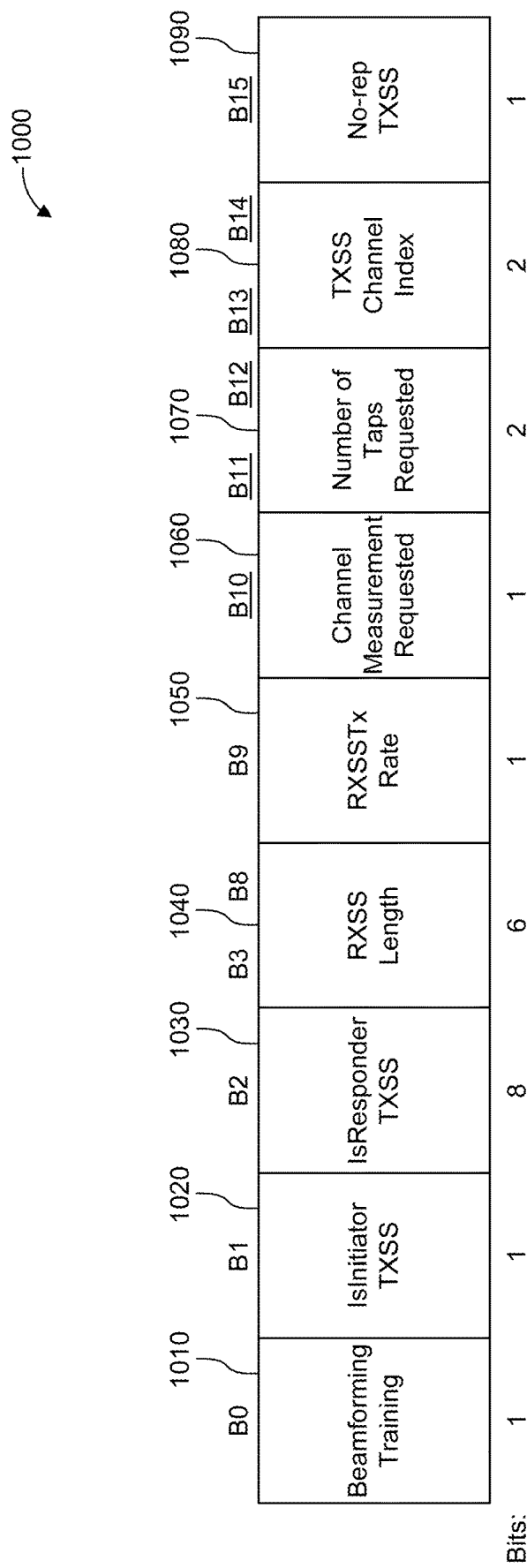
FIG. 10 is a bitmap illustrating an example beamforming (BF) control field format.

FIG. 10 is a bitmap which illustrates an example modified BF Control field format 1000. BF Control Field format 1000 includes Beamforming Training subfield 1010; IsInitiatorTXSS subfield 1020; IsResponderTXSS subfield 1030; RXSS Length subfield 1040; RXSSTxRate subfield 1050; Channel Measurement Requested subfield 1060; Number of Taps Requested subfield 1070; TXSS Channel Index subfield 1080; and No-rep TXSS subfield 1090.

BF Control field format 1000 can be used, for example, when both ISInitiatorTXSS subfield 1020 and ISResponderTXSS subfield 1030 are equal to 1, Beamforming Training subfield 1010 is equal to 1, and/or the BF Control field is transmitted in an Allocation field. If a BF Control field having format 1000 is transmitted in an Allocation field and when both IsInitiatorTXSS 1020 and IsResponderTXSS 1030 subfields are equal to 1, and/or Beamforming Training field 1010 is equal to 1, the Channel Measurement Requested subfield 1060 can be set to 1 to indicate the Channel Measurement subfield is requested as part of MIMO BF training feedback in SISO phase. Otherwise, the Channel Measurement Requested subfield 1060 is set to 0. It is noted that here, as throughout this specification, bit values are exemplary. In different examples, any suitable bit mapping or combination of bits can be used to convey the desired information. For example, bits expressed as set to 1 to represent certain information in on example implementation could be set to 0 to represent the same information in other implementations.

If a BF Control field having format 1000 is transmitted in an Allocation field and where both IsInitiatorTXSS subfield 1020 and IsResponderTXSS 1030 subfield are equal to 1, and Beamforming Training field 1010 is equal to 1, the Number of Taps Requested subfield 1070 can be set to the Number of taps requested in each channel measurement. This subfield can be reserved if Channel Measurement Requested 1060 subfield is set to 0.

If a BF Control field having format 1000 is transmitted in an Allocation field and where both IsInitiatorTXSS subfield 1020 and IsResponderTXSS subfields 1030 are equal to 1, and Beamforming Training field is equal to 1, a TXSS Channel index subfield 1080 with value i indicates i+1-th lowest channel number of the allocation can be the channel used for TXSS.

If the BF Control field is transmitted in an Allocation field and where both IsInitiatorTXSS subfield 1020 and IsResponderTXSS subfield 1030 are equal to 1, and Beamforming Training field 1010 is equal to 1, the No-rep TXSS subfield 1090 can be set to 1 to indicate the TXSS is to be performed as if the last negotiated Number of RX DMG Antennas fields are equal to 1 from both the initiator and the responder. Otherwise, the No-rep TXSS subfield 1090 is set to 0.

It is noted that the number of bits and the start bit of modified BF Control field format 1000 may not be exactly as shown in FIG. 10. The modified BF Control field format 1000 may be used for a Grant frame, SPR frame, Extended Schedule Element, and/or DMG TSPEC element.

It is noted that where the No-rep TXSS subfield 1090 bit is set to 1 in a Grant and/or Grant ACK frame, the Number of RX DMG Antenna field originally included in the Grant and/or Grant ACK frame may be ignored or reserved. The No-rep TXSS subfield 1090 bit may be used by the AP or initiator to indicate that the TXSS may not be repeated for RX antennas regardless of how many RX antennas are available at the STA or responder side.

It is noted that instead of using a TXSS channel index, where a BF control field 1000 has beamforming training field 1010 set to 1, the AP or STA may set the BW field to indicate a single 2.16 GHz channel. This may avoid ambiguity regarding upon which channel the SLS is scheduled/requested.

In some implementations, a modified Control Trailer may be used. For example FIG. 11 is a table which describes example fields which may be added to the Control Trailer. It is noted that the number of bits and the start bit may not be exactly as shown in the table of FIG. 11. The above mentioned control trailer fields may be used, for example, in a Grant frame, SPR frame, RTS frame, and/or CTS-2-Self frame with control trailer.

In some implementations, a modified BRP frame may be used. By using a modified BRP frame, it may be possible to add a bandwidth indication and/or channel number information in the BRP frame. Example modifications may include a channel indication/bandwidth indication for feedback request, or channel indication/bandwidth indication for feedback type.

Figure 12:
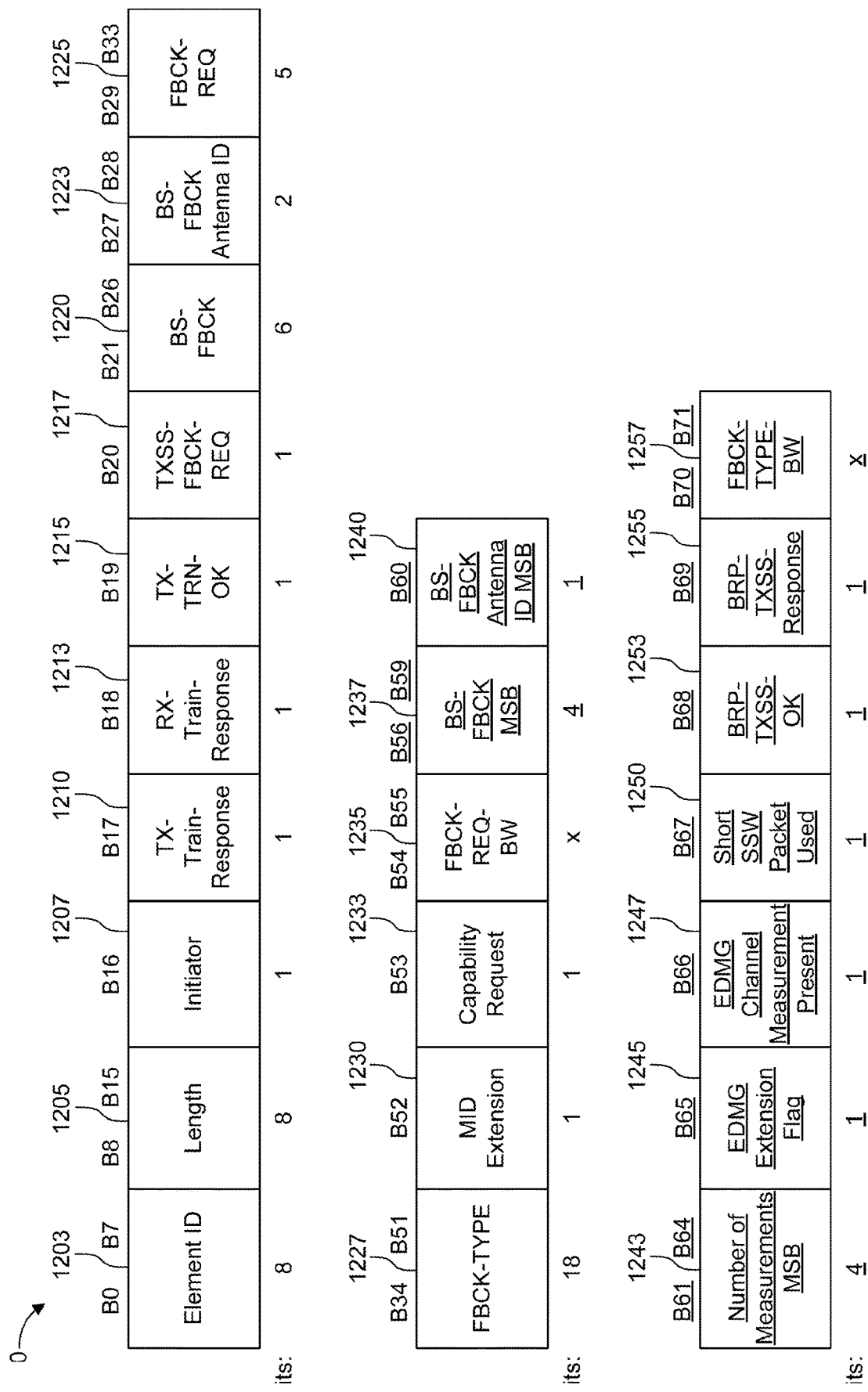
FIG. 12 is a bitmap illustrating an example directional multi-gigabit (DMG) beam refinement element.

FIG. 12 is a bitmap which illustrates an example modified DMG Beam Refinement Element format 1200. DMG Beam Refinement Element format 1200 includes Element ID field 1203, Length field 1205, Initiator field 1207, TX-train-response field 1210, RX-train-response field 1213, TX-TRN-OK field 1215, TXSS-FBCK-REQ field 1217, BS-FBCK field 1220, BS-FBCK Antenna ID field 1223, FBCK-REQ field 1225, FBCK-TYPE field 1227, MID Extension field 1230, Capability Request field 1233, FBCK-REQ-BW field 1235, BS-FBCK MSB field 1237, BS-FBCK Antenna ID MSB field 1240, Number of Measurements MSB 1243, EDMG Extension Flag field 1245, EDMG Channel Measurement Present field 1247, Short SSW Packet Used field 1250, BRP-TXSS-OK field 1253, BRP-TXSS-response field 1255, and FBCK-TYPE-BW field 1257.

A DMG Beam Refinement Element in a BRP frame may be modified in one or more of the following ways. FBCK-REQ-BW 1235 may be used to indicate the channel index or bandwidth indication requested for the feedback. FBCK- TYPE-BW 1257 may be used to indicate the channel index or bandwidth indication for the feedback conveyed in current BRP frame. In some implementations, the information may be carried in two elements/fields; e.g., the channel indication/bandwidth indication for feedback request may be carried in an EDMG BRP Request element, and channel indication/bandwidth indication for feedback type may be carried in EDMG Channel Measurement Feedback element. In some implementations, a channel indication/bandwidth indication may be added to the beginning of an element immediately following the element ID extension field.

A BRP frame may also or alternatively be modified to include a No-Rep TXSS field. The No-rep TXSS can be set to 1 to indicate that TXSS should be performed as if the last negotiated Number of RX DMG Antennas fields are equal to 1 from both the initiator and the responder. Otherwise, the No-rep TXSS can be set to 0. This field (e.g., a bit) in the BRP frame may be used to enable setup for a BRP TXSS procedure. In this procedure, BRP frames can be used to setup the TXSS procedure.

Some implementations provide a MIMO Training Procedure with Full CSI Feedback. In some implementations assuming the MIMO Multi-channel BF setup may be performed in BTI, ATI or Grant/Grant ACK frames in DTI, ATI or channel measurement may be requested. In this case, a simplified MIMO BF training procedure may be applied.

Figure 13:
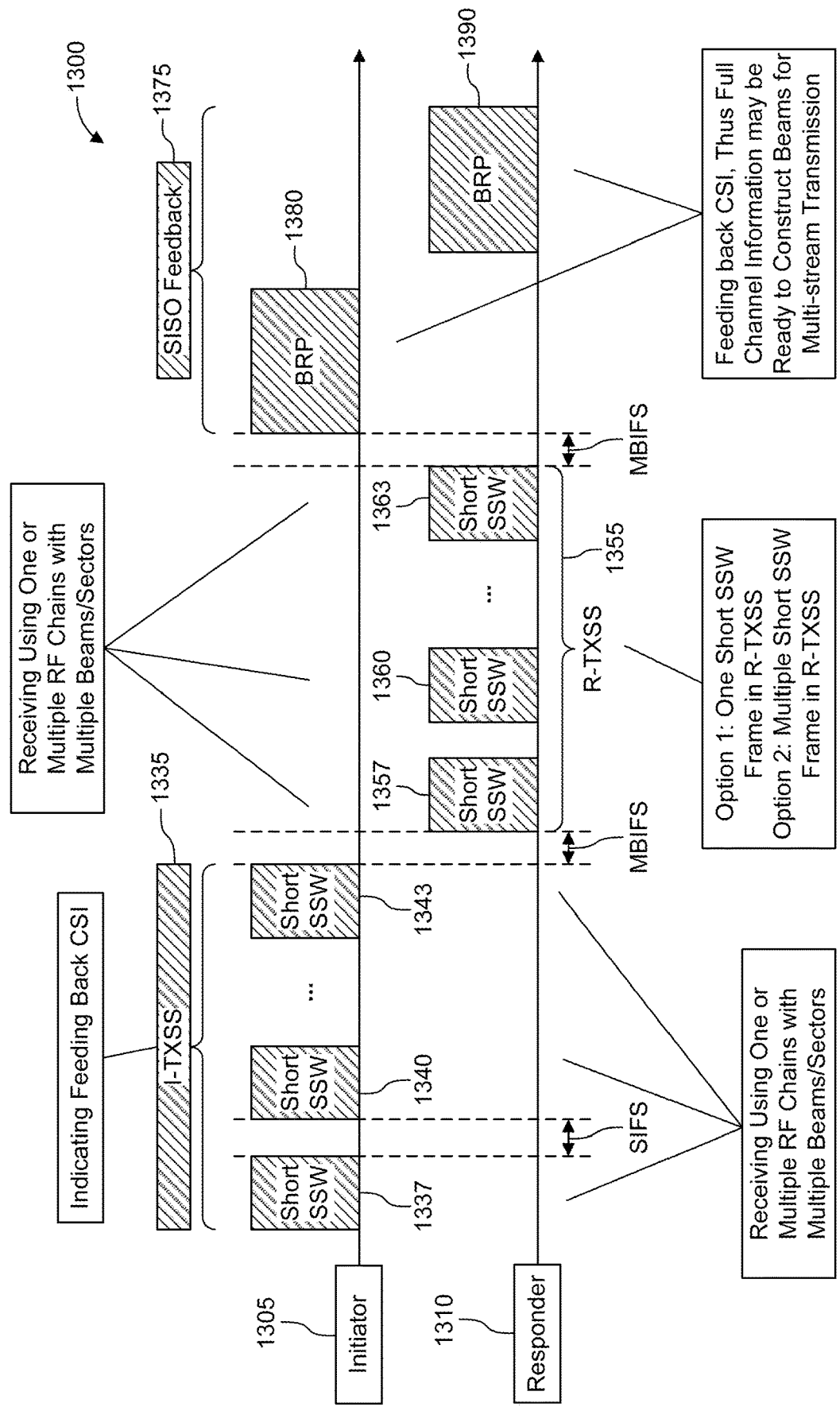
FIG. 13 is a signal diagram illustrating an example MIMO training procedure with full CSI information feedback.

FIG. 13 is a signal diagram which illustrates a simplified exemplary MIMO BF training procedure 1300 between an initiator 1305 and a responder 1310. The example procedure includes a setup sub-phase, an initiator TXSS (I-TXSS) sub-phase 1335, a responder (R-TXSS) sub-phase 1355, and a SISO feedback sub-phase 1375.

In the setup subphase, an initiator may acquire the medium using MIMO BF training setup by the AP using a scheduling element, such as an Extended Schedule Element. Alternatively, the initiator may set up the MIMO BF training using a Grant or Grant-like frame before the MIMO BF training. Example detailed MIMO BF setting procedures are discussed above regarding MIMO training setup. For example, an exemplary setting may include the following. In an Extended Schedule Element, the BF Control field may be set as follows: Both IsInitiatorTXSS and IsResponderTXSS subfields may be set to 1 and the Channel Measurement Requested subfield may be set to 1 to indicate the Channel Measurement subfield is requested as part of MIMO BF training feedback in SISO phase. The Number of Taps Requested subfield may be set to the number of taps requested in each channel measurement. The No-rep TXSS field may be set to 1 to indicate that there is no need to repeat TXSS for the receiver to change and train another receive antenna. Alternatively to the Extended Schedule Element Setting, in a Grant frame, the control trailer may be set as follows: Both IsInitiatorTXSS and IsResponderTXSS subfields may be set to 1. The Channel Measurement Requested field may be set to 1 to indicate Channel Measurement subfield is requested. The Number of Taps Requested subfield may be set to the number of taps requested in each channel measurement. The No-rep TXSS may be set to 1 to indicate that there is no need to repeat TXSS for the receiver to change and train another receive antenna.

Alternatively, the setup subphase may be performed as follows: A STA, which may be able to perform MIMO reception, may use full RF chains for reception in case of BF training; e.g., if CSI feedback is requested by the initiator. The initiator may set up the MIMO BF training details in the training procedure; for example, using a SSW frame, short SSW frame, and/or BRP frame.

In the I-TXSS subphase 1335, the initiator 1305 may begin an initiator sector level sweep by transmitting short SSW frames 1337, 1340, . . . , 1343 using different antennae and beams. The initiator 1305 may choose trained beams that are orthogonal. The initiator 1305 and/or responder 1310 may use the channel measurements to reconstruct the physical channel. In some implementations, a field (e.g., a bit) in short SSW frames 1337, 1340, . . . , 1343 may be used to indicate the requested feedback type. For example, if the bit is set to 1, it may indicate a SNR feedback, while if the bit is set to 0, it may indicate full channel state information (CSI) feedback. In some implementations, the MIMO multi-channel BF setup may be performed before I-TXSS subphase 1335, and a detailed feedback request may be set up between the initiator 1305 and responder 1310. Between short SSW frames 1337, 1340, . . . , 1343, within each subphase, a predefined interframe spacing is used. In this example, a short interframe spacing (SIFS) is shown, however any suitable arbitrary predefined interframe spacing may be used.

The responder 1310 may receive the I-TXSS short SSW frames 1337, 1340, . . . , 1343 transmitted from the initiator 1305. In some implementations, the responder may identify the I-TXSS short SSW frames 1337, 1340, . . . , 1343 as intended for MIMO BF training (e.g., through MIMO training setup in BTI, ATI and/or DTI). Accordingly, the responder 1310 may use all (or some) receive chains to receive. In some implementations, the responder 1310 may not train its receive beams, and may use a quasi-omnidirectional beam to receive, during the MIMO BF training. For example, a quasi-omnidirectional beam may be formed on each RF chain. In some implementations, the responder 1310 may have trained its receive beams before the MIMO BF training; thus, it may use the trained beams for reception. For each short SSW frame 1337, 1340, . . . , 1343, the responder 1310 may use all (or some) of its receive chains to measure the observed channels (i.e., channels between the transmitter and the receive using corresponding Tx and Rx beams). If a time domain channel measurement is utilized, then Ntap channel measurements may be obtained for a multi-tap channel for each receive chain. Thus, for N consecutive short SSW frames and Nr receive chains, the responder 1310 may have N×Nr×Ntap channel measurements. The responder 1310 may prepare to feedback the channel measurements to the initiator 1305. Alternatively, if the responder 1310 identifies the transmit beams used at the initiator side, the responder 1310 may re-construct the N×Nr physical MIMO channel between the initiator and the responder 1310 such that up to Nr beamforming weights may be obtained. Each beamforming weight may contain Nt_element complex numbers. Here Nt_element may be the total number of antenna elements supported at the initiator side. Here, it can be assumed for exemplary purposes that there are Nt transmit antennas at initiator side, where each transmit antenna may support multiple antenna elements. Thus Nt_element>=Nt. To acquire a full channel accurately, the number of transmitted training frames, e.g., short SSW frames, N, may be greater than or equal to Nt. The responder 1310 may feedback the Nr beamforming weights. In some implementations, the responder 1310 may feedback the Nr phase shifter sets obtained by the Nr beamforming weights. The phase shifter may include the phase of each complex number in the beamforming weights.

In the R-TXSS subphase 1355, the responder 1310 may initiate a responder sector level sweep by transmitting a short SSW frame 1360, . . . , 1363 using different antennae and beams. The initiator 1305 may choose trained beams that are orthogonal. Thus, the initiator and/or responder 1310 may use the channel measurements to reconstruct the physical channel. In some implementations, the responder 1310 and initiator 1305 procedure in R-TXSS may be the same as initiator 1305 and responder 1310 procedure in I-TXSS respectively. In some implementations, the responder 1310 may not train the responding link using sweep multiple responder beams, but instead may transmit one short SSW frame 1357, to the initiator 1305 to feedback the best TX beam observed in the previous I-TXSS. In short SSW frames, the responder may indicate the best SISO sector observed in the previous I-TXSS, which may enable the next transmission from the initiator 1305 to the responder 1310 to be directional. Between each subphase, (e.g., between Short SSW 1343 and 1357) a predefined interframe spacing is used. In this example, a medium beamforming interframe spacing (MBIFS) is shown, however any suitable arbitrary predefined interframe spacing may be used.

In the SISO Feedback subphase 1375, the initiator 1305 may transmit a BRP frame 1380 to the responder. The BRP frame may be transmitted using the SISO sector fed back from previously received short SSW frame 1357, 1360, . . . , 1363 in R-TXSS subphase 1355. The initiator 1305 may identify that a CSI or channel measurement is requested by the responder 1310 through MIMO Training setup. Some or all of the following information may be carried in the BRP frame 1380: Channel measurement requested; Best SISO sector/antenna observed in R-TXSS; Channel measurement feedback element: in this element, a measured channel or processed precoding weights may be feedback; and/or EDMG channel measurement feedback element. The responder 1310 may transmit a BRP frame 1390 to the initiator. The BRP frame 1390 may be transmitted using the SISO sector fed back from the previously received BRP frame 1380 transmitted from the initiator 1305. The responder 1310 may identify that a CSI or channel measurement is requested by the initiator 1305 through MIMO Training setup or the previously received BRP frame 1380 transmitted from the initiator 1305. In the BRP frame 1390, some or all of the following information may be carried: Channel measurement feedback element (in this element, a measured channel or processed precoding weights may be fed back); EDMG channel measurement feedback element.

After the above-described MIMO BF training, the initiator 1305 may obtain a set of weights (e.g., from the feedback), which may be used to provide a higher rank MIMO transmission. The initiator 1305 may determine, based on the feedback, to skip the MIMO phase training and directly perform MIMO transmission (e.g., if the weights are sufficient to provide high rank (e.g., multiple data stream) communication between the initiator 1305 and the responder 1310). The responder 1310 may use a quasi-omnidirectional mode on all of its receive antennae to receive the MIMO transmission if the receive antennae have not previously been trained.

In some implementations, the initiator 1305 and responder 1310 may determine to perform MIMO training to train directional receive beams. In some implementations, the responder 1310 may suggest additional MIMO training in the BRP feedback phase. In some implementations, the initiator 1305 may determine whether to perform additional MIMO training based on the feedback from responder 1310. For the MIMO training, the initiator 1305 may select a set of TX beams or a set of TX combinations (i.e., sets of TX beams and AVWs), which may be formed by a set of amplitude vector weights (AVWs.) The AVWs may or may not be a subset of the beams used for SLS. For example, the AVWs may be formed by performing singular value decomposition (SVD) on the obtained MIMO channel. The initiator 1305 may use MIMO phase to repeat transmitting the selected TX beam combinations, such that the responder 1310 may sweep using a set of receive beams. The responder 1310 may select one or a set of responder beams for farther MIMO reception. In some implementations, the responder 1310 may choose to sweep a set of orthogonal receive beams. By measuring the channel response using the receive beams, the responder 1310 may obtain an Nt×Nr_component channels. Here, Nr_component may be the total number of receive antenna elements. The receive antenna weight vectors (AWV) may be formed by using the Nt×Nr_component channels; e.g., by performing SVD on the channel and obtaining a set of AWVs.

Procedures may be provided to enable SLS on multiple channels. Both short SSW frames and SSW frames may be transmitted with a control mode. The control mode may not be able to indicate bandwidth. In order to enable SLS with SSW and/or short SSW frames on non-primary channels, MIMO training setup may be requested.

During a TXSS, and if a channel used for TXSS was provided by a grant frame, Extended Schedule Element, or EDMG Extended Schedule Element, the initiator and responder may send a SSW frame or short SSW frame on the channel. The initiator may send duplicate SSW frames or duplicate short SSW frames on a channel in addition to the channel used for TXSS, if duplicated transmissions are required by the DMG channel access rules.

Figure 14:
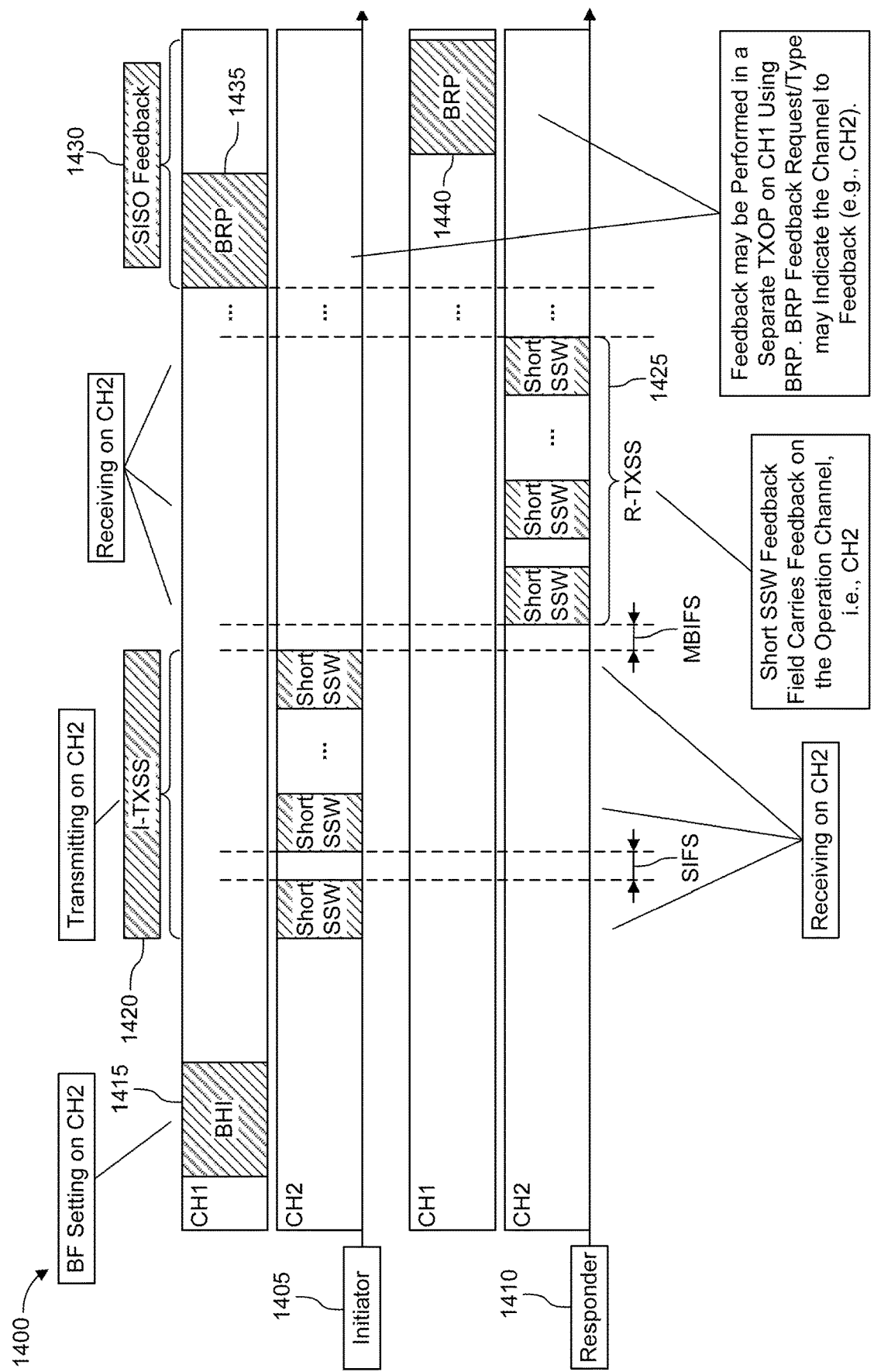
FIG. 14 is a signal diagram illustrating an example sector level sweep (SLS) procedure on a secondary channel.

FIG. 14 is a signal diagram illustrating an example SLS procedure 1400 on a secondary channel. In this example, channel 1 (Ch1) is the primary channel and channel 2 (Ch2) is the secondary channel.

An initiator 1405, which may be an AP, may set up the MIMO multi-channel BF training in a Beacon Header interval 1415, including BTI or ATI, by using modified frames, field, and signaling, such as those described earlier. In this example, the initiator 1405 may indicate an allocation of SLS using short SSW frames in Ch2. Example setup information may be included in an Extended Schedule Element, or in a Grant frame. In an Extended Schedule Element, the BF Control field may be set as follows. Both IsInitiatorTXSS and IsResponderTXSS subfields may be set to 1 and TXSS Channel index field may be set to the channel index. In this example, the channel index may indicate Ch2. In a Grant frame, the control trailer may be set as follows. Both IsInitiatorTXSS and IsResponderTXSS subfields may be set to 1 and TXSS Channel index field may be set to the channel index. In this example, the channel index may indicate Ch2.

The initiator 1405 may perform I-TXSS 1420 on Ch2, while the responder 1410 may receive of I-TXSS 1420 on Ch2. The responder 1410 may perform R-TXSS 1425 on Ch2, while the initiator 1405 may receive R-TXSS 1425 on Ch2. It is noted that in SSW frames or Short SSW frames transmitted in R-TXSS 1425, the best TX sector/antennas observed in previous I-TXSS 1420 may be included and fed back to the initiator 1405. The feedback information may be measured on the same channel where the SSW frame or the Short SSW frames may be transmitted. In this example, the short SSW frame may be transmitted over Ch2, thus, the feedback information may be measured based on Ch2.

In a feedback subphase 1430, in some implementations, the initiator 1405 may transmit a SSW feedback frame (BRP frame 1435 in this example) to the responder, and the responder may transmit a SSW ACK frame (BRP frame 1440 in this example) to the initiator. Using these frame exchanges, the feedback information may be measured on the same channel where the SSW frame or the Short SSW frames may be transmitted. In this example, short SSW frames may be transmitted over Ch2, thus, the feedback information may be measured based on Ch2. The initiator 1405 may transmit a SSW feedback frame, as BRP frame 1435, to the responder 1410, and the responder 1410 may transmit a SSW feedback frame, as BRP frame 1440, to the initiator, for SISO feedback. The transmission of the BRP frame may be performed on the primary channel (Ch1), and the feedback information may be measured on another channel, e.g., Ch2.

In procedure 1400, the initiator 1405 may be an AP. In some implementations however, the procedure may be implemented using two non-AP STAs. In that case, the AP may set up the MIMO training on secondary channel using BTI or ATI, while the non-AP STAs may be the initiator and responder. In some implementations, SLS for multiple channels may be performed by using a BRP TXSS procedure; e.g., as defined in IEEE 802.11ay, with one or more of the following modifications. In the BRP frames, which may be used to set up the BRP TXSS, Feedback Req BW and/or Feedback Type BW fields may be included to indicate the channel number or bandwidth of channel measurements or SNRs measured and reported in the feedback. In the BRP frames, which may be used for BRP TXSS training, Feedback Req BW and/or Feedback Type BW fields may be included to indicate the channel number or bandwidth of channel measurements or SNRs measured and reported in the feedback. The BRP frames may be transmitted using duplicate mode on multiple channels. On the primary channel, the BRP frames may be transmitted using trained directional beams if available. On the non-primary channel or channels, the BRP frames may be transmitted using quasi-omnidirectional direction if no SLS/beamforming training has been performed before. The training (TRN) fields may be appended using channel bonding or channel aggregation. The responder may receive the BRP frame on the primary channel, and may perform channel measurement using the TRN field on the channel indicated in the Feedback Req BW field. In the BRP frames, which may be used to carry BRP TXSS feedback, Feedback Req BW and/or Feedback Type BW fields may be included to indicate the channel number or bandwidth of channel measurements or SNRs measured and reported in the feedback.

An SLS-based MU MIMO grouping mechanism may be provided, e.g., to address the MU-MIMO user grouping issue. For example, an AP may transmit an EDMG Group Management ID before performing MIMO BF training. Thus, the AP may need more information to decide which STAs may be grouped. For this example, it may be assumed that the AP may have performed SLS with STAs and may group users based on the feedback from SLS training. In some examples, in a case where the SLS may be performed using SSW frame and feedback may be using SSW frame with SSW Feedback field, the Sector Sweep Feedback field may be modified to carry worst sector information, for example, as shown in FIG. 15.

Figure 15:
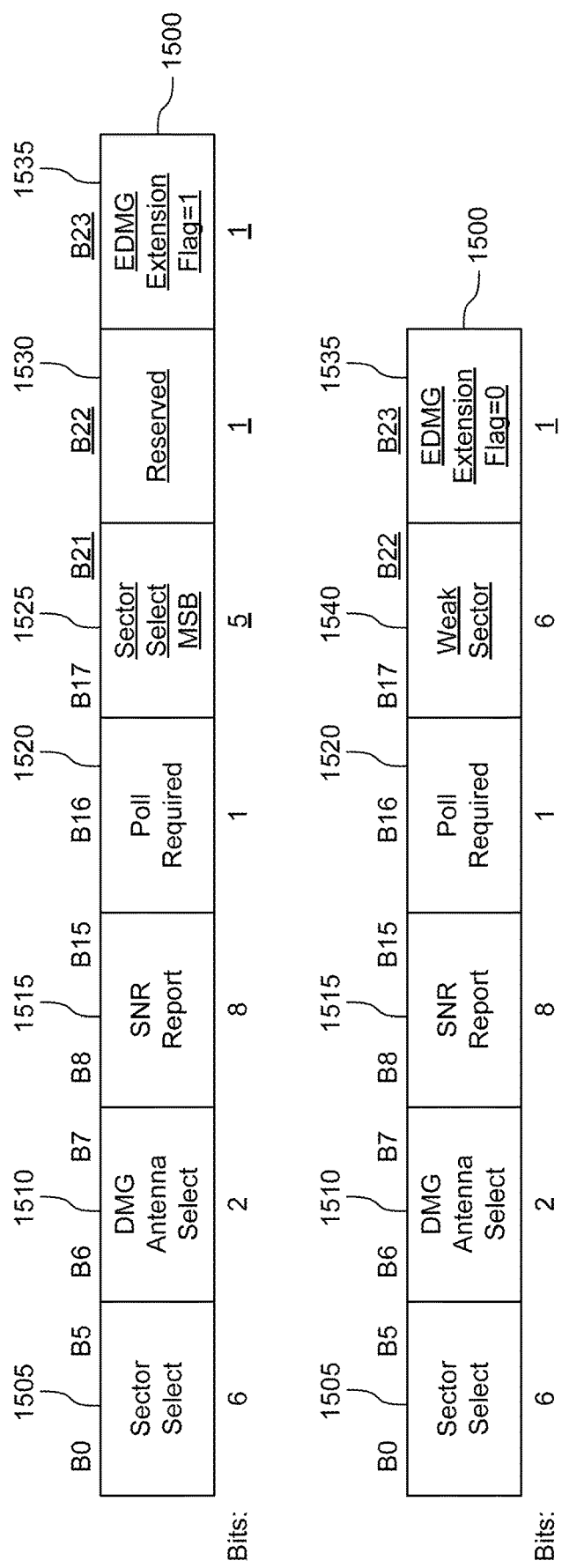
FIG. 15 is a bitmap illustrating an example sector sweep feedback field.

FIG. 15 is a bitmap illustrating an example sector sweep feedback field 1500. Sector sweep feedback field 1500 includes Sector Select field 1505; DMG Antenna Select field 1510; SNR Report field 1515; Poll Required field 1520; and Sector Select MSB field 1525; Reserved field 1530; and EDMG Extension Flag field 1535.

As shown in FIG. 15, in a case where the EDMG Extension Flag field 1535 is set to 0, a 6 bit Weak Sector field 1540 may be indicated in the SSW feedback field 1500, replacing the Sector Select MSB field 1525 and Reserved field 1530. Weak Sector field 1540 may indicate, for example, a sector on which the STA detects negligible (e.g., below a threshold) energy. The AP may use this sector to transmit to other STAs, and the STA may not observe significant interference. Having this information ready at the AP side may facilitate the AP in grouping users and/or to minimize the interference between them.

In some example implementations, in a Beamforming Training Allocation procedure, e.g., as defined in IEEE 802.11ay, the best transmit sectors for each STA may be implicitly indicated by slot based feedback transmission.

For example, if a STA transmits in a slot associated with SectorID=K, it may implicitly indicate that TX sector K is the best sector (e.g., based on STA measurement) for the STA. In some implementations, a SSW frame or short SSW frame may be used as a feedback frame. Thus, the sector ID field in SSW or short SSW frame in the Beamforming SP may be re-interpreted as a weak sector suggested by the STA. Alternatively, the sector ID field in SSW or short SSW frame in Beamforming SP may be re-interpreted as a second strongest sector suggested by the STA.

Figure 16:
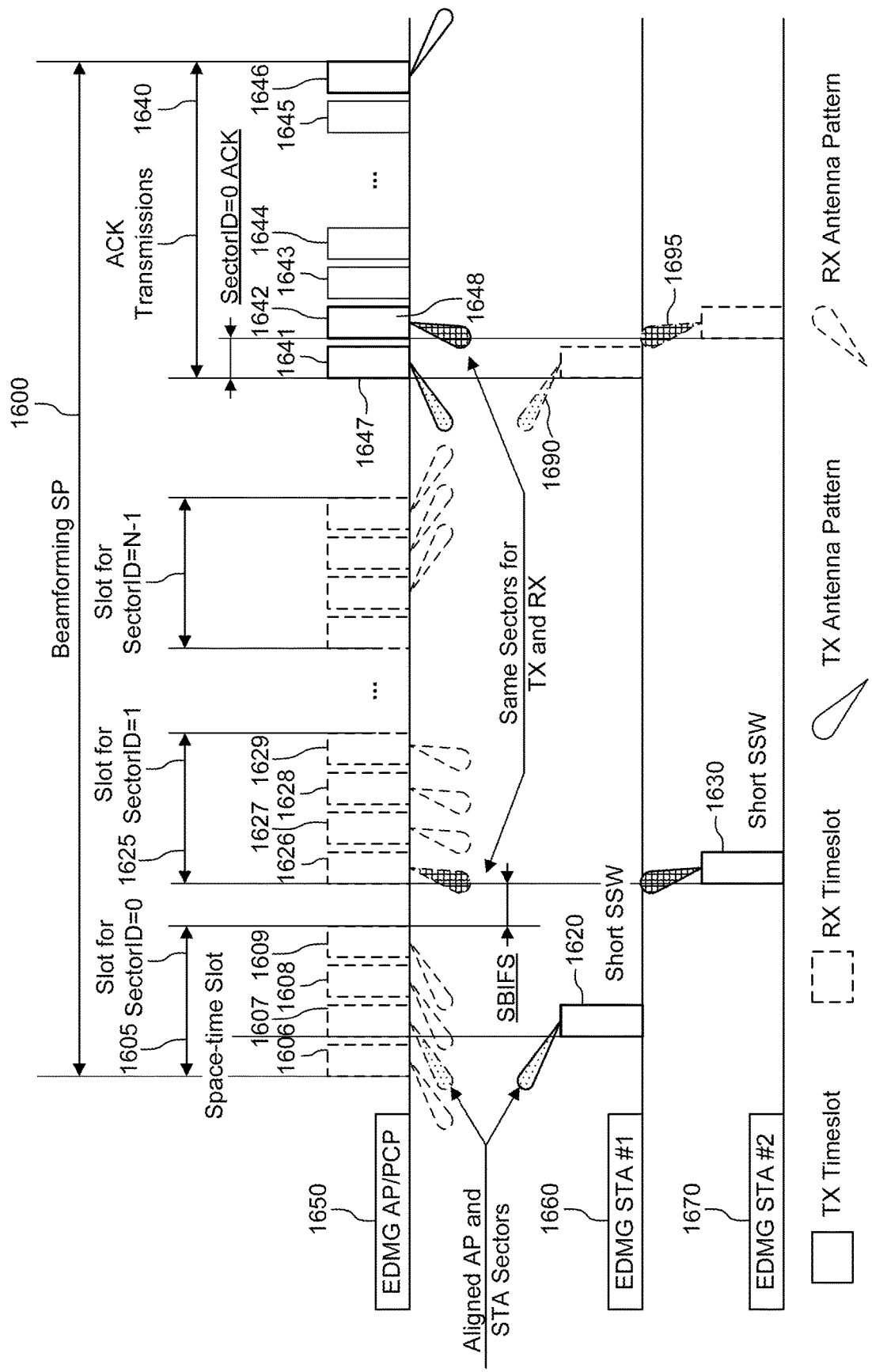
FIG. 16 is a signal diagram illustrating beamforming training for asymmetric links in a beamforming training allocation.

FIG. 16 is a signal diagram illustrating beamforming training for asymmetric links in a beamforming training allocation during a beamforming SP 1600. During SP 1600, an EDMG AP/PCP 1650 scans for a SSW on each of its receive antenna sectors. For example, during slot 1605, EDMG AP/PCP 1650 scans on sector 0 (SectorID=0) in each of several space-time slots 1606, 1607, 1608, 1609. During slot 1605, EDMG STA 1660 transmits a short SSW 1620 using its selected transmit sector. During space-time slot 1607, the transmit antenna pattern of EDMG STA 1660 is aligned with the receive antenna pattern of EDMG AP/PCP 1650 (i.e., slot 0 in this example), which receives short SSW 1620.

Similarly, during slot 1625, EDMG AP/PCP 1650 scans on sector 1 (SectorID=1) in each of several space-time slots 1626, 1627, 1628, 1629. In some examples, slot 1625 begins one short beamforming interframe space (SBIFS) after slot 1605 ends. During slot 1625, EDMG STA 1660 transmits a short SSW 1630 on its selected transmit sector. During space-time slot 1626, the transmit antenna pattern of EDMG STA 1670 is aligned with the receive antenna pattern of EDMG AP/PCP 1650 (i.e., slot 1 in this example), which receives short SSW 1630.

EDMG AP/PCP 1650 continues scanning on its other sectors until ACK slot 1640. During ACK slot 1640, EDMG AP/PCP 1650 transmits a Short SSW ACK signal for each of its sectors in space-time slots 1641, 1642, 1643, 1644, . . . , 1645, 1646. For example, EDMG AP/PCP 1650 transmits a Short SSW ACK signal 1647 to EDMG STA 1660 during slot 1641 that acknowledges short SSW 1620. During ACK slot 1640, EDMG STA 1660 is receiving on its strongest beam 1690, which is the receive beam corresponding to the transmit beam used to transmit short SSW frame 1620. Receipt of Short SSW ACK signal 1647 by EDMG STA 1660 during slot 1641 implies the strongest transmission sector of EDMG STA 1660 is that on which it transmitted Short SSW 1620. Because the strongest transmission sector is implied, the sector ID field in the short SSW frame 1620 can be used to signal a weak sector suggested by EDMG STA 1660, or a second-strongest sector, or other information.

Similarly, EDMG AP/PCP 1650 transmits a Short SSW ACK signal 1648 to EDMG STA 1670 during slot 1642 that acknowledges short SSW 1630. During ACK slot 1640, EDMG STA 1670 is receiving on its strongest beam 1695, which is the receive beam corresponding to the transmit beam used to transmit short SSW frame 1630. Receipt of Short SSW ACK signal 1648 by EDMG STA 1670 during slot 1642 implies the strongest transmission sector of EDMG STA 1670 is that on which it transmitted Short SSW 1630. Because the strongest transmission sector is implied, the sector ID field in the short SSW frame 1630 can be used to signal a weak sector suggested by EDMG STA 1670, or a second-strongest sector, or other information.

In some examples, IFS negotiation may be provided to address the BRP feedback issue discussed earlier. In some implementations, a QoS Null frame may be transmitted using a duplicate control mode to enable transmission. For example, to enable a non-enhanced directional multi-gigabit (non-EDMG) duplicate control mode, a transmission format of the physical layer (PHY) may be provided that duplicates a 2.16 GHz non-EDMG transmission in two or more 2.16 GHz channels and allows a station (STA) in a non-EDMG basic service set (BSS) on any one of the 2.16 MHz channels to receive the transmission so that a STA which may be able to detect on a single channel understands the transmission. If the AP supports multiple channels, the duplicate transmission may duplicate the transmission on the primary channel. An example non-EDMG duplicate format can include one of the following. 4.32 GHz non-EDMG duplicate: A transmission format of the PHY that replicates a 2.16 GHz non-EDMG transmission in two adjacent 2.16 GHz channels. 6.48 GHz non-EDMG duplicate: A transmission format of the PHY that replicates a 2.16 GHz non-EDMG transmission in three adjacent 2.16 GHz MHz channels. 8.64 GHz non-EDMG duplicate: A transmission format of the PHY that replicates a 2.16 GHz non-EDMG transmission in four adjacent 2.16 GHz channels. 2.16+2.16 GHz non-EDMG duplicate: A transmission format of the PHY that replicates a 2.16 GHz non-EDMG transmission in two frequency segments of one 2.16 GHz channel. 4.32+4.32 GHz non-EDMG duplicate: A transmission format of the PHY that replicates a 2.16 GHz non-EDMG transmission in two frequency segments of two adjacent 2.16 GHz channels, where the two frequency segments of channels are not necessarily adjacent.

In some implementations, an EDMG STA transmitting an RTS frame carried in non-EDMG duplicate format and addressed to an EDMG STA shall set a TXVECTOR parameter CH_BANDWIDTH to the selected channel bandwidth. To provide complete bandwidth signaling information and MIMO indication, the EDMG STA may include a control trailer in the transmitted RTS frame.

A control trailer may be inserted in a control mode PPDU to provide additional control signaling. An EDMG STA shall set the TXVECTOR parameter CONTROL_TRAILER to Present to indicate the presence of the control trailer in a control mode PPDU and may set the TXVECTOR parameter CT_TYPE to indicate the type of control trailer to be included in the PPDU.

In some examples, e.g., to address the IFS negotiation for the BRP feedback issue discussed earlier, a QoS Null frame may be followed by multiple delimiters and thereafter a feedback (FB) frame may be transmitted. When performing BRP, if a responding STA requires longer than a SIFS to transmit a BRP frame as a response to a beam refinement training request from a requesting STA, the responding STA may keep the IFS equal to or shorter than the beam refinement protocol inter frame spacing (BRPIFS) by transmitting one or more PPDUs to the requesting STA. This may also be done to prevent expiration of the beam link maintenance timer if a DMG STA does not have MSDUs to send. In this case, the DMG STA may transmit QoS Null frames to maintain a beamformed link. Each QOS null frame may be at least 30 octets in size (e.g., FIGS. 17 and 18). To reduce the quantization of the delay, multiple DMG MPDU delimiters of size 4 octets may be sent after the QOS null frame until the information is ready to be transmitted, rather than the legacy method, where repeated QOS null frames would be sent.

Figure 17:
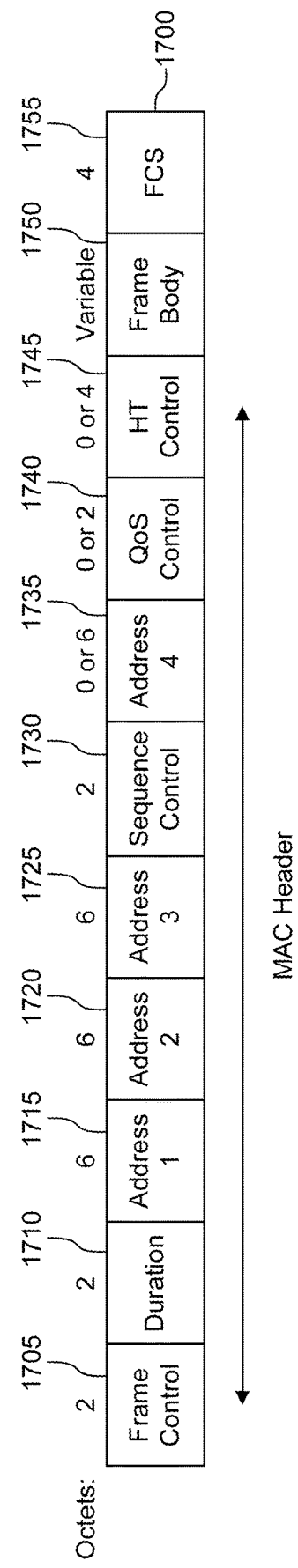
FIG. 17 is a bitmap illustrating an example data frame.

FIG. 17 is a bitmap illustrating an example data frame 1700. Example data frame 1700 includes Frame Control field 1705, Duration field 1710, Address 1 field 1715, Address 2 field 1720, Address 3 field 1725, Sequence control field 1730, Address 4 field 1735, QoS control field 1740, HT Control field 1745, and FCS field 1755. In this example, the Frame Control field 1705, Duration field 1710, Address 1 field 1715, Address 2 field 1720, Address 3 field 1725, Sequence control field 1730 are present in all data frame subtypes. The presence of the Address 4 field 1735 is determined by the setting of To DS and From DS subfields of the Frame Control Field 1705. Whether the QoS Control field 1740 is present is determined based on a QoS subfield of a Subtype of the Frame Control Field 1705 (e.g., if the QoS subfield is set to 1). The Frame Control field 1705, Duration field 1710, Address 1 field 1715, Address 2 field 1720, Address 3 field 1725, Sequence control field 1730, Address 4 field 1735, QoS control field 1740, and HT Control field 1745 make up a MAC header of the data frame 1700.

FIG. 18 is a bitmap illustrating an example QoS data frame 1800 and an example QoS Null frame 1850. Example QoS data frame 1800 includes TID field 1805, EOSP field 1810, ACK policy field A-MSDU Present field 1820, A-MSDU Type field 1825, RDG/More PPDU field 1830, Buffered AC field 1835, Reserved field 1840, and AC Constraint field 1845. Example QoS Null frame 1850 includes TID field 1805, EOSP field 1810, ACK policy field Reserved field 1855, Reserved field 1860, RDG/More PPDU field 1830, Buffered AC field 1835, Reserved field 1840, and AC Constraint field 1845.

Figure 19:
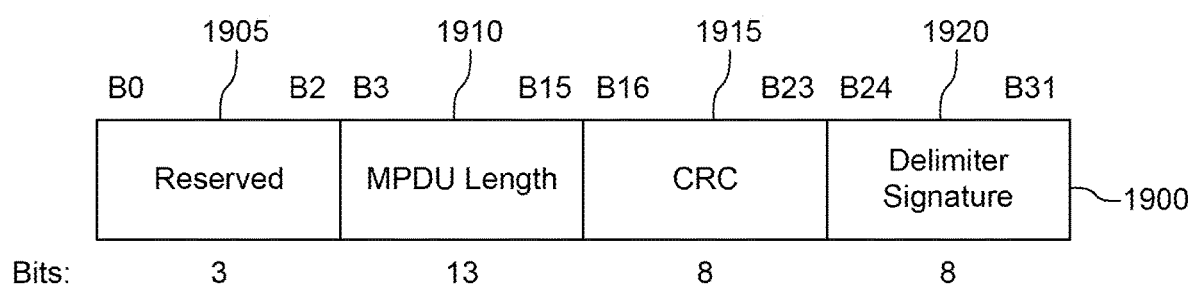
FIG. 19 is a bitmap illustrating an example DMG media access control packet data unit (MPDU) delimiter.

The MPDU delimiter may be 4 octets in length. FIG. 19 is a bitmap illustrating an example MPDU Delimiter field 1900 representative of an example structure for the MPDU Delimiter field when transmitted by a DMG or EDMG STA. MPDU Delimiter field 1900 includes Reserved field 1905, MPDU Length field 1910, cyclic redundancy check (CRC) field 1915, and Delimiter Signature field 1920. In this example, the MDPU length field 1910 can be set to zero for delimiters that are placeholders.

Figure 20:
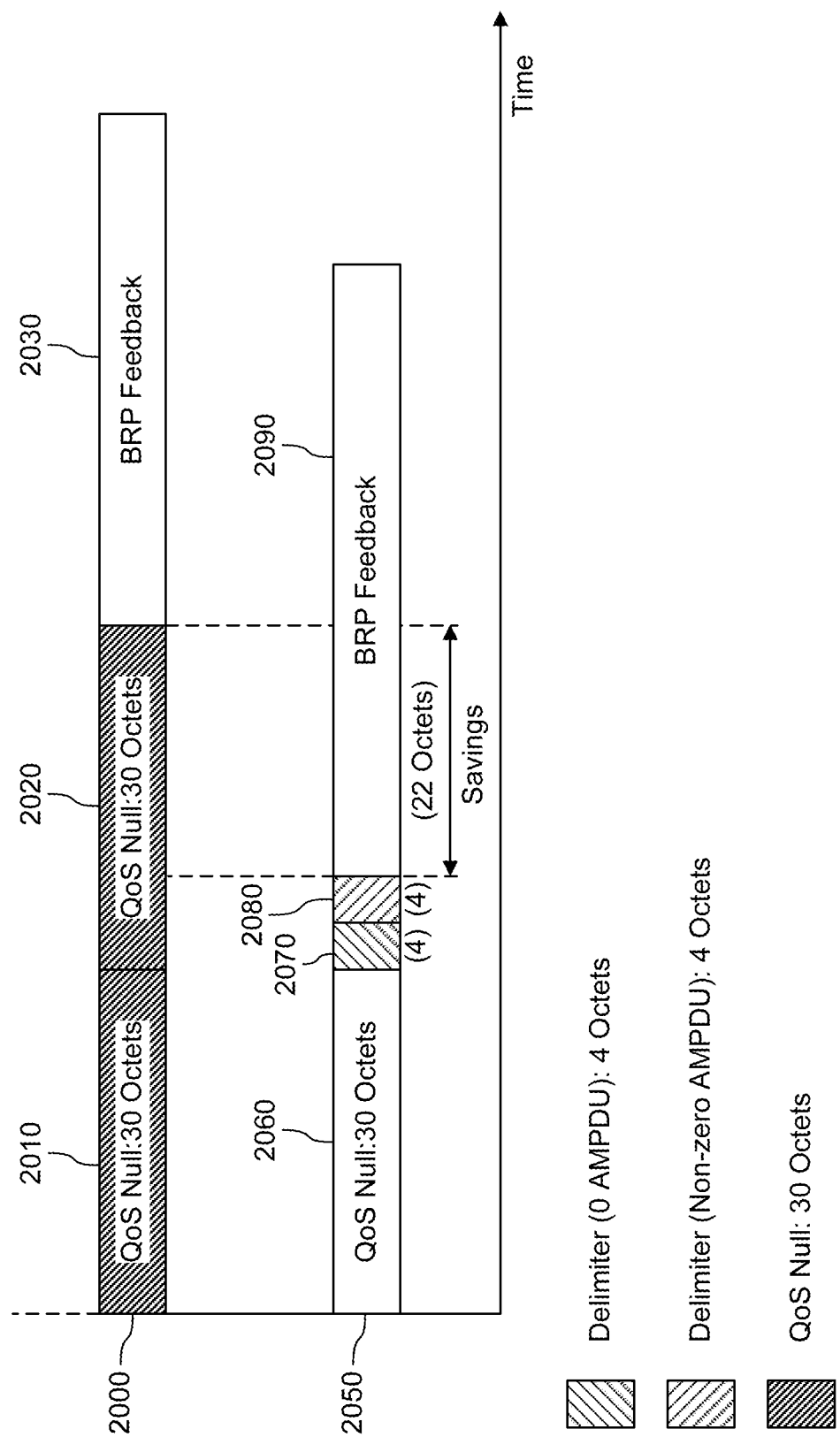
FIG. 20 is a signal diagram illustrating example savings realized using delimiters.

FIG. 20 is a signal diagram illustrating example overhead savings that may be realized using delimiters during BRP. In this example, overhead savings represents a reduction in the amount of time that a STA needs to reserve the medium unnecessarily. In a first procedure 2000 a QoS Null frame 2010 is transmitted by a responding STA. In this example, the QoS Null frame 2010 is 30 octets long. In this example, the responding STA still does not have BRP feedback available to transmit after transmitting QoS Null frame 2010. Accordingly, a second QoS Null frame 2020 is transmitted by the responding STA. The second QoS Null frame 2020 is also 30 octets long. In this example, BRP feedback information becomes available for the responding STA to transmit during the transmission of QoS Null frame 2020. Accordingly, BRP feedback 2030 is transmitted by the responding STA following QoS Null frame 2020.

In a second procedure 2050, a QoS Null frame 2060 is transmitted by a responding STA. In this example, the QoS Null frame 2060 is 30 octets long. In this example, the responding STA still does not have BRP feedback available to transmit after transmitting QoS Null frame 2060. Accordingly, a DMG MPDU delimiter 2070 is transmitted by the responding STA. The DMG MPDU delimiter 2070 is 4 octets long. In this example, the responding STA still does not have BRP feedback available to transmit after transmitting QoS Null frame 2060. Accordingly, a DMG MPDU delimiter 2080 is transmitted by the responding STA. The DMG MPDU delimiter 2080 is also 4 octets long. In this example, BRP feedback information becomes available for the responding STA to transmit during the transmission of DMG MPDU delimiter 2080. Accordingly, BRP feedback 2090 is transmitted by the responding STA following DMG MPDU delimiter 2080.

In the example procedure 2050, the responding STA transmits an initial QOS Null and then subsequently transmits A-MPDU delimiters until feedback information is ready to be sent. Thus, the responding STA begins transmitting BRP feedback 22 octets earlier in procedure 2050 as compared with procedure 2000. This illustrates an advantage of using a DMG MPDU delimiter in this way.

In some examples, a DMG MPDU delimiter transmitted before the BRP feedback transmission may indicate that the next transmission is a non-zero packet.

Figure 21A:
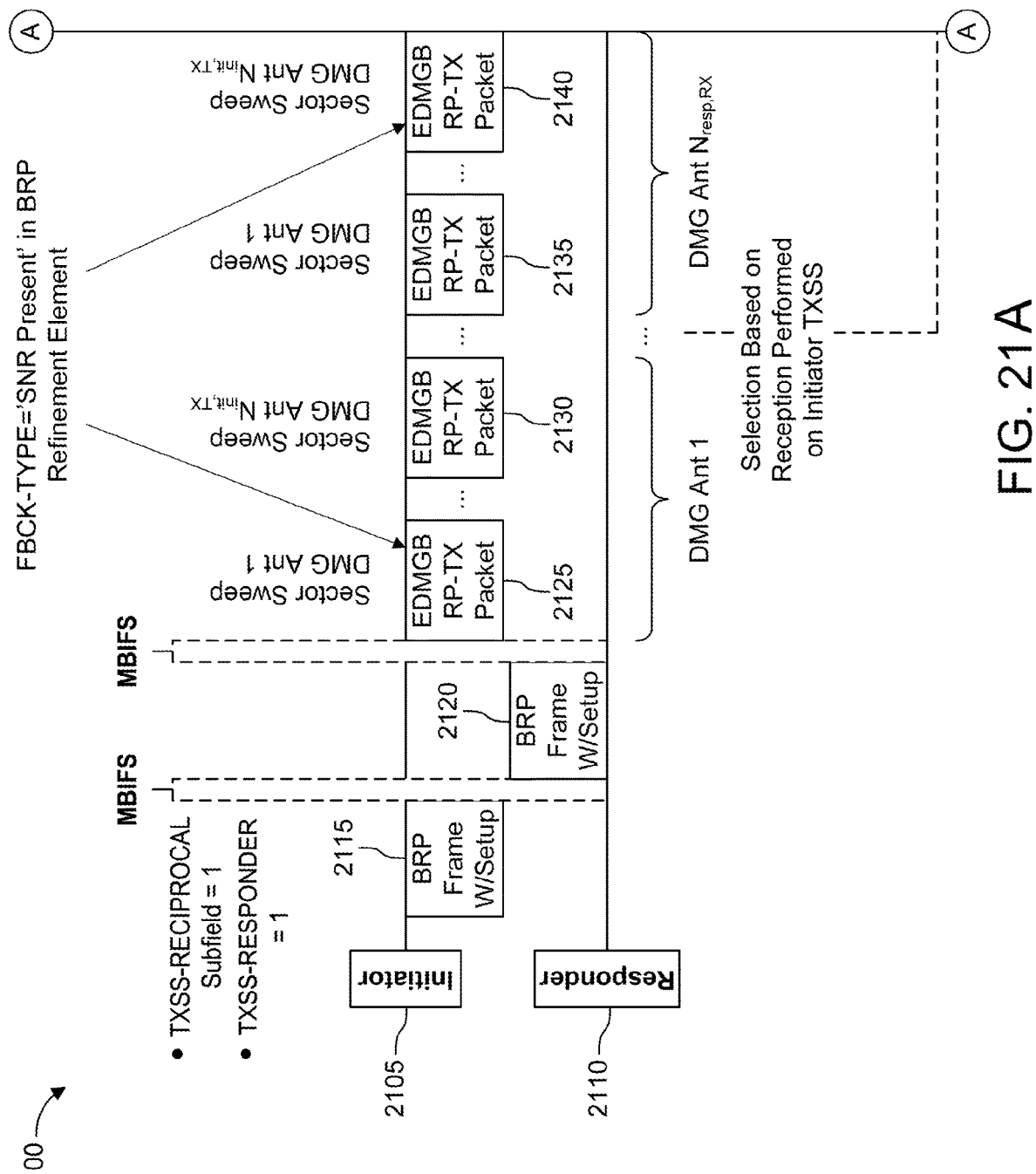
FIGS. 21A and 21B are a signal diagram illustrating an exemplary modified BPR TXSS procedure.
Figure 21B:
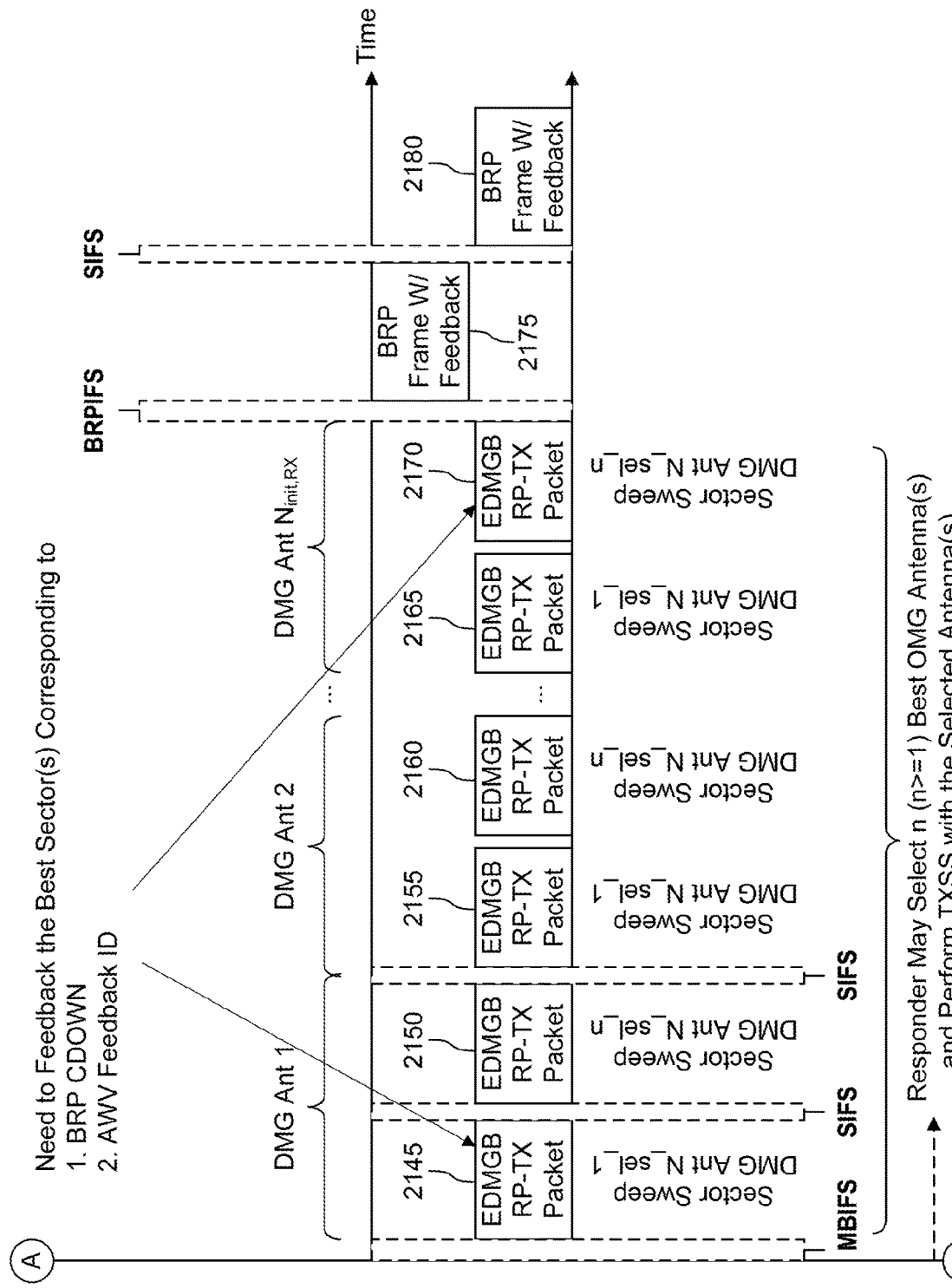

FIGS. 21A and 21B are a signal diagram illustrating an exemplary modified BRP TXSS procedure 2100 between an initiator 2105 and a responder 2110. A BRP frame 2115 may be transmitted from initiator 2105 to responder 2110 to setup the BRP TXSS. The BRP frame 2115 may include two fields; TXSS-RECIPROCAL and TXSS-RESPONDER. If the TXSS-RECIPROCAL subfield in the EDMG BRP Request element of the same frame is set to 1 and TXSS-RESPONDER subfield in the EDMG BRP Request element of the BRP frame that initiates the BRP TXSS is equal to 1, a procedure which uses channel reciprocity may be applied. If the TXSS-RESPONDER subfield in the EDMG BRP Request element of the BRP frame that initiates the BRP TXSS is equal to 1, the procedure may include an Initiator BRP TXSS and a Responder BRP TXSS, which is assumed for this example. BRP frame 2120 carries setup information from responder 2110 to initiator 2105 using the same or similar fields as BRP frame 2115.

In the Initiator TXSS, the responder 2110 may receive on multiple RX antennas sequentially or concurrently. In this example, responder 2110 detects using DMG antenna 1 through DMG antenna $N_{resp,RX}$ sequentially while initiator 2105 performs a transmit sector sweep. During the time when responder 2110 is detecting with each DMG antenna, initiator 2105 transmits EDMG BRP-TX packets 2125, 2130, 2135, 2140 over each of its DMG transmit antennas. It is noted that in some implementations, EDMG BRP-RX packets may be used instead of EDMG BRP-TX packets.

Each RX antenna may form a quasi-omnidirectional beam or directional beam. During the Initiator TXSS, the responder may observe that one or more RX antennas perform better than the rest. The antenna performance may be measured by SNR, SINR, RSSI etc.

In the Responder TXSS, the responder 2110 may determine (e.g., based on an assumption of antenna reciprocity with the receive antenna of the responder) to use one or more RX antennas which performs better (e.g., in terms of SNR, SINR, RSSI, or other suitable metric) than others in receiving the Initiator TXSS (i.e., EDMG BRP-TX packets 2125, 2130, 2135, 2140) to transmit for the Responder TXSS. In procedure 2100, N_sel_1 to N_sel_n antennas are chosen to perform responder TXSS. Responder 2110 transmits EDMGB RP-TX packets 2145, 2150, 2155, 2160, ... 2165, 2170 from each of the N_sel_1 to N_sel_n antennas to initiator 2105 while initiator 2105 receives on each of its DMG antenna 1 through DMG antenna $N_{init,RX}$ respectively.

A BRP CDOWN field of each EDMG BRP TX packet transmitted in the Responder TXSS may indicate the number of remaining EDMG BRP TX packets to be transmitted by the responder 2110.

After the Initiator TXSS and Responder TXSS phases, an identification of one or more best (e.g., in terms of SNR, SINR, RSSI, or other suitable metric) sectors may be fed back from receiver to transmitter. For example, initiator 2105 transmits BRP 2175 to responder 2110, and responder 2110 transmits BRP 2180 to initiator 2105.

If BRP packets are used in the previous Initiator TXSS, the feedback sectors may be identified using the BRP CDOWN value and AWV feedback ID. In order to include BRP, CDOWN and AWV feedback ID in a BRP feedback frame, the BRP frame may include an EDMG Channel Measurement Feedback element. In cases where an EDMG Channel Measurement Feedback element is not present, one or more other elements and/or fields in the BRP frame may be modified to include BRP CDOWN numbers.

An SLS with a Receive Antenna Indication may be implemented; e.g., to address the SSW feedback issue which results in the responder having different antennas for transmitting and receiving discussed earlier. In some embodiments, an RSS message may indicate an identity of an Rx antenna and/or RF chain that received the selected sector and/or CDOWN with the best receiving quality (e.g., in terms of SNR, SINR, RSSI, or other suitable metric). Based on this indication, the initiator may select a responder sector and/or CDOWN which corresponds to the indicated responder antenna/RF chain, in a following feedback message, such that the responder transmit and receive antennas, after receiving the feedback message, will be identical or matched.

In some implementations, a bit may be added to a short SSW packet, a SSW frame, or any other packet used to perform RSS, in order to indicate that the current transmitting antenna (or RF chain) is the antenna (or RF chain) which received the selected sector indicated in the SSW feedback field (or short SSW feedback field) with the best quality.

In an example implementation, the bit may be included in a short SSW packet and/or SSW frame used for RSS, or in a BRP TXSS packet. The initiator may select and indicate a sector corresponding to the antenna of the responder having the best Rx quality in a following feedback message (e.g., SSW Feedback). The antenna having best Rx quality may be indicated by the bit or bits added to the RSS message/packet. The initiator may select a responder sector based on received signal strength and/or quality of the initiator antenna and/or RF chain of the initiator sector selected by the responder in the RSS. For example, the initiator may use only the received signal quality from the RF chain and/or antenna of the initiator sector selected by the responder in the RSS to choose the responder sector. If the bit is included in a short SSW packet, it may replace one of the reserve bits in a Short SSW packet where the Direction field is equal to 1. If the bit is included in a SSW frame, it may replace one of the reserve bits in a BRP request field.

FIG. 22 is a bitmap illustrating an example short SSW packet format 2200 where the Direction field is 1 (R-TXSS). Short SSW packet format 2200 includes a Packet Type field 2205, a Direction field 2210 (set to 1 in this example), a Best Rx RF Chain field 2215, Source AID field 2220, Destination AID field 2225, CDOWN field 2230, RF Chain ID field 2235, Short SSW Feedback field 2240, and FCS field 2245. Here, the Best Rx RF Chain field 2215 can be used to indicate an identity of an RF chain or receive antenna that received a selected sector with the best quality out of all receiving sectors using all receive RF chains/antennas.

FIG. 23 is a bitmap illustrating an example BRP Request field format 2300. BRP Request field format 2300 includes a L-RX field 2305, TX-TRN-REQ field 2310, MID-REQ field 2315, BC-REQ field 2320, MID-Grant field 2325, BC-Grant field 2330, Chan-FBCK-CAP field 2335, TX Sector ID field 2340, Other_AID field 2345, TX Antenna ID field 2350, Additional Feedback Requested field 2355, Best Rx Antenna field 2360, and Reserved field 2365. Here, the Best Rx Antenna field 2360 can be used to indicate an identity of an antenna that received a selected sector with the best quality out of all receiving antennas.

In some implementations, the sector and/or CDOWN selected and/or fed back may depend on the antenna and/or RF chain transmitting the RSS packet. The sector/CDOWN selected//indicated in a SSW Feedback field, short SSW Feedback field, or in any other feedback field of a RSS packet, may be different for different antenna/RF chains of the responder.

For example, in an RSS packet transmitted by the responder using a particular RF chain and/or antenna, the selected CDOWN/sector of the initiator may be chosen based on the receiving strength and/or quality during the ISS using the antenna, (e.g., best initiator sector that is received using this responder antenna/RF chain).

If the initiator transmits a following feedback message (e.g. SSW Feedback) using a Tx sector x selected and/or indicated in one of the RSS message, the feedback message may select a responder sector and/or CDOWN that uses responder antenna and/or RF chain j, while initiator sector x is selected/indicated in a RSS message transmitted using responder antenna/RF chain j.

The initiator may determine an initiator antenna and/or RF chain i which receives the best quality of RSS message. It may determine one or more RSS messages which indicate and/or select an initiator sector which uses antenna and/or RF chain i. Then the initiator selects the responder sector based on sector id and/or CDOWN of these RSS messages, in a following feedback message (e.g. SSW Feedback).

The initiator may transmit the following feedback message (e.g. SSW Feedback) using the initiator sector indicated in the RSS message transmitted from the selected responder sector. The responder may not know which initiator sector is used to transmit the following feedback message (e.g. SSW Feedback) and what corresponding Rx antenna the responder should use, e.g., because the responder has selected more than one initiator sector in different RSS messages transmitted from different responder antennas. The responder may listen on more than one RF chain and/or antenna to receive the feedback message.

Alternatively, the initiator may have knowledge that the responder is not capable of receiving the feedback message using multiple antennas concurrently. In this case, the initiator may only select a sector from a pre-agreed responder antenna x in the feedback message, and the responder may only use antenna x for receiving the feedback message, and for transmitting the ACK of the feedback message. The preselected antenna may be agreed by both initiator and responder, and may be specified or signaled before the transmission.

After the responder receives the feedback message, it may determine the Tx and/or Rx antenna to be used for the subsequent communications based on the sector id and/or CDOWN selected in the feedback message. The responder may switch off the other RF chains and/or antennas.

In some implementations, the responder may switch to a different antenna/RF chain based on the responder sector selected in a feedback message from initiator. For example, if the initiator indicates a responder sector in a feedback message (e.g., in SSW Feedback), and the indicated responder sector corresponds to a different antenna x from an antenna y that the responder is using to receive the feedback message, the responder may switch from antenna y to x to transmit the ACK to the feedback message (e.g., SSW ACK).

In the feedback field of the ACK message (e.g., an SSW feedback field of SSW ACK), the responder may choose not to indicate the best initiator sector received by the antenna x, if this best initiator sector (received by the responder antenna x) is not a sector of the same initiator antenna that corresponds to an initiator sector z that was chosen by the responder in the RSS messages (i.e., the initiator sector indicated in the message used in the responder TX sector sweep). The responder may choose an initiator sector which uses the same antenna/RF chain as sector z.

Figure 33:
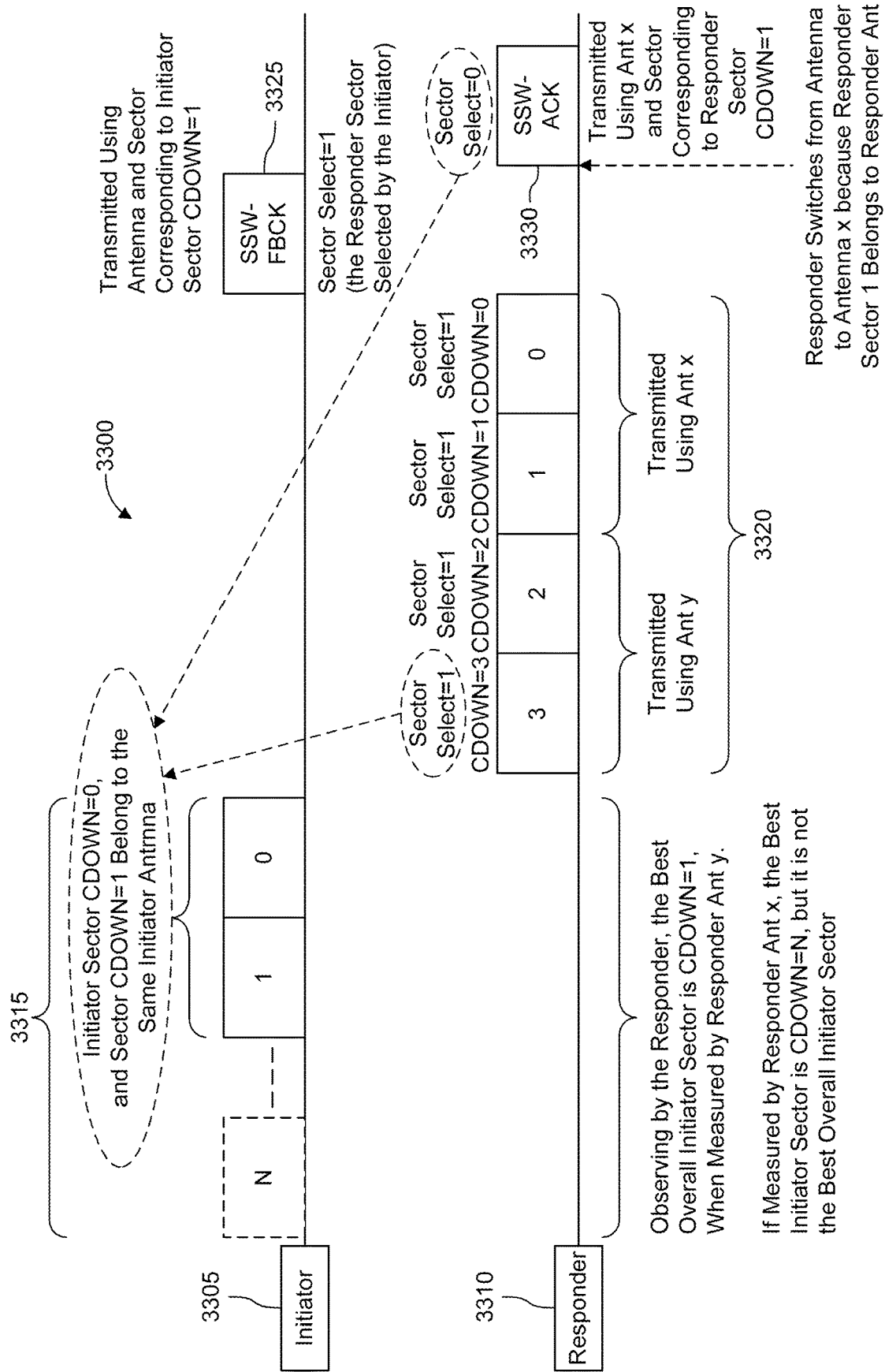
FIG. 33 is a signal diagram illustrating another example SLS procedure with a receive antenna indication.

FIG. 33 is a signal diagram of an example SLS procedure 3300 between initiator 3305 and responder 3310 which illustrates this concept. For example, in FIG. 33, the SSW frame received best overall by responder 3310 during sector sweep 3315 indicates its initiator sector as CDOWN=1 (i.e., sector z), and was received by antenna y of responder 3310. As measured by responder antenna x of responder 3310, the best initiator sector would appear to be the initiator sector indicated by CDOWN=N. However, the initiator sector indicated by CDOWN=N is not the best overall initiator sector received by the responder 3310.

Responder 3310 transmits SSW frames to initiator 3305 during sector sweep 3320 which indicate the best overall initiator sector, CDOWN=1, by setting the sector select of each SSW frame equal to 1. The SSW frame received best overall from responder 3310 by initiator 3305 during SSW 3320 indicates responder sector using CDOWN=1. This sector corresponds to responder antenna x.

Because the best overall initiator sector was received by the responder antenna y, the responder 3310 uses antenna y to receive the SSW-FBCK message 3325. By receiving SSW-FBCK message 3325, the responder 3310 is informed that the initiator selected the responder sector with CDOWN=1, which belongs to the responder antenna x. Accordingly, the responder switches from antenna y to antenna x to send SSW-ACK message 3330. However, in the SSW-ACK message 3330 transmitted by responder antenna x, the responder 3310 does not indicate (or select) the initiator sector with CDOWN=N (i.e., the best initiator sector received by responder antenna x), but rather indicates the initiator sector with CDOWN=0 (by setting the sector select equal to 0), which corresponds to the same initiator antenna transmitting the initiator sector with CDOWN=1 (i.e., sector z).

In this example, the initiator 3305 selected the responder sector corresponding to CDOWN=1/antenna x in SSW-FBCK message 3325 because it did not know the reported best initiator sector was measured by responder antenna y. By selecting CDOWN=0 in SSW-ACK message 3330, the responder 3310 eliminates the need for the initiator 3305 to switch to another antenna, and avoids repeated antenna switching at both sides.

In some implementations, a STA may have the capability to perform Tx and Rx using different antennas. For example, a capability may be indicated prior or during the SLS procedure, such that initiator and/or responder would know whether one or more of the implementations described above are required in order to avoid the sector selection resulting different Tx and Rx antennas.

The capability indication could be included in an EDMG capabilities element and exchanged together with other capabilities. The initial SLS between initiator and responder may be performed with single RX antenna/RF chain only, to facilitate the subsequent communication for this capability exchange. The capability may be included in the SLS packet itself, such that it is learned from the SLS process, without a prior capability exchange.

Figure 24:
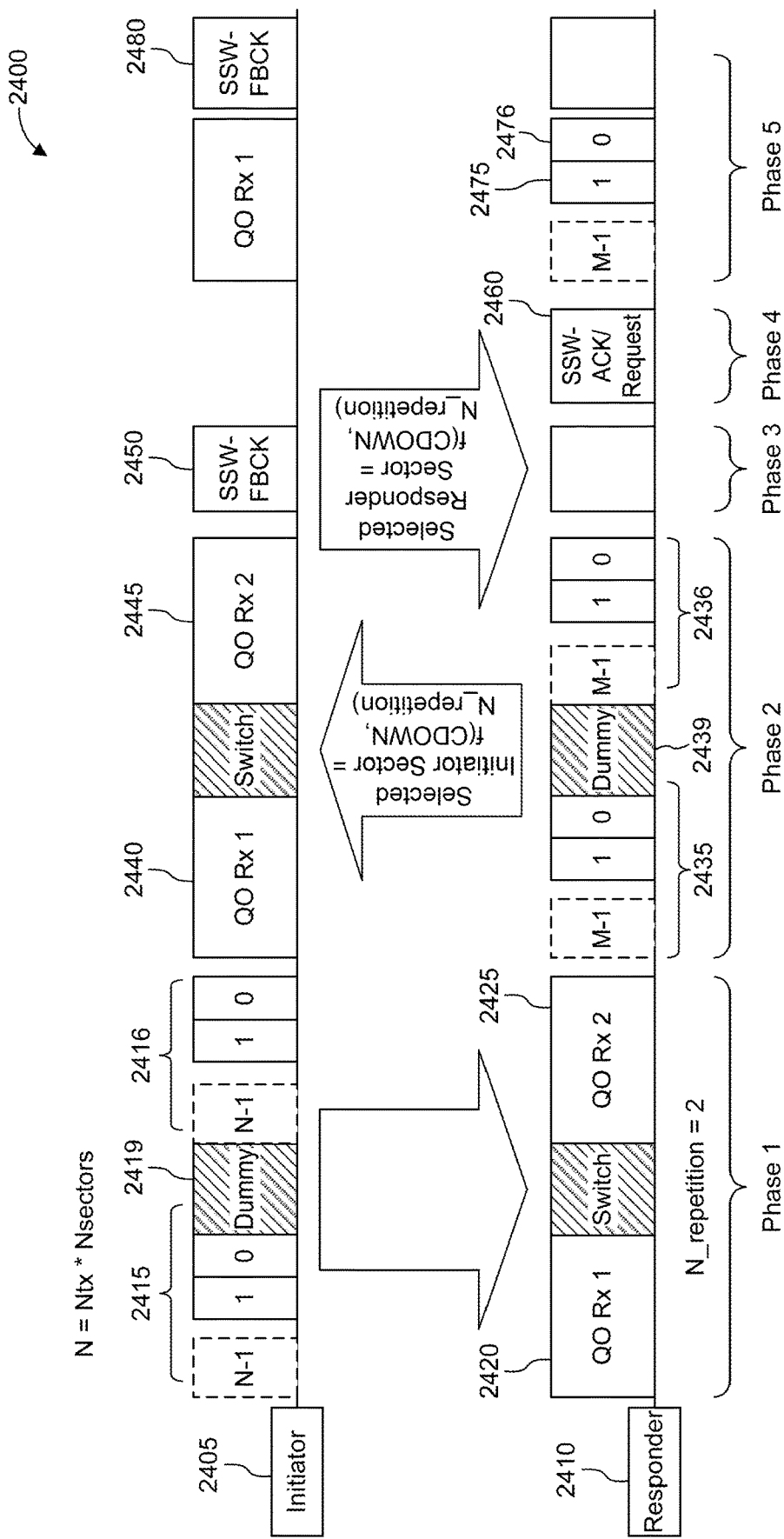
FIG. 24 is a signal diagram illustrating example frame exchanges for an example procedure for SLS using multiple transmit and receive antennas.

Some implementations may include a procedure for SLS using multiple transmit and receive antennas. FIG. 24 is a signal diagram illustrating example SLS communications 2400 between an initiator 2405 and responder 2410. Initiator 2405 uses Ntx transmit antennas, each with N sectors, and responder 2410 uses Nrx receive antennas, each with M sectors.

In a first phase of operation, initiator 2405 transmits measurements to responder 2410 in frames 2415, 2416 over Max(CDOWN)=(N×Ntx) sectors. Frames 2415, 2416 may be SSW frames, short SSW frames, or any other type of frame suitable for SLS. Each number corresponds to a frame transmitted using a sector. Accordingly, in phase 1, 2N frames are transmitted. Each frame in the sets of frames 2415, 2416 includes a CDOWN. In some examples, the CDOWN parameter may be counted across the total number of sectors in the initiator 2405. In this case, if the CDOWN parameter is greater than the number of sectors in a transmit antenna, the responder 2410 (transmitter) can implicitly estimate the index of the transmit antenna based on the CDOWN feedback received (e.g., floor(CDOWN/Nsectors)). In some examples, the CDOWN parameter may be counted across each transmit antenna in the initiator 2405. In this case, the initiator 2405 may also transmit the transmit antenna index so that the responder 2410 is able to identify the specific transmit antenna used.

The initiator 2405 may transmit frames with CDOWN parameters N_repetition times. In cases where the responder 2410 is capable of receiving on one antenna at a time, N_repetition may be equal to the number of receive antennas of the responder 2410. In cases where the responder 2410 is capable of receiving on N_concurrent_antennas antennas at a time (i.e., an antenna group), N_repetition may be equal to N_rx/N_concurrent_antennas (or ceil(N_rx/N_concurrent_antennas)). During reception, each receive antenna of responder 2410 may be set to a quasi-omnidirectional receive antenna beam. In the example SLS communications 2400, N_repetition=2, and frames 2416 can be viewed as a repetition of frames 2415.

To facilitate synchronization between the responder 2410 receive antenna (or antenna group) and the initiator 2405 transmit frames (i.e., synchronized in the sense that the responder receive antenna is switched to the antenna that the initiator transmit frames assume), one or more of the following approaches may be implemented. A repetition number parameter, in addition to the CDOWN parameter, may be transmitted in each section of the measurement frame. A signal may be transmitted between each repetition of the measurement frame to indicate that a change in receive antennas (or antenna groups) should be carried out. The signal may be, for example, a "dummy" signal such as a signal having a known sequence, a signal with a known sequence and good auto/cross correlation properties or a signal explicitly indicating the index of the measurement group. The transmit antenna/sector may be set to the first transmit antenna/sector used in transmitting the measurement frame. The dummy signal may be transmitted using an antenna pattern/set of antenna patterns with corresponding transmit power (e.g. boosted power) to ensure that the STA receives the signal to switch antennas, where the transmitter may switch to a quasi-omnidirectional transmit antenna or may sweep through all the transmit antennas/sectors (e.g., with a short duration signal to reduce overhead).

In the example SLS communications 2400, initiator 2405 transmits dummy signal 2419 to responder 2410 after the first repetition (i.e., after frames 2415) and responder 2410 switches from receiving on a first receive antenna (Rx1) 2420 to receiving on a second receive antenna (Rx2) 2425.

In a second phase of operation, the roles of the initiator and responder may be reversed, in the sense that the initiator may be set to receive and the responder may be set to transmit. Here, the responder may also indicate the best antenna (or antenna group) corresponding to the responder Rx antennas and CDOWN index corresponding to the initiator sector in the transmission to the initiator.

In the example SLS communications 2400, responder 2410 transmits measurements to initiator 2405 in frames 2435, 2436. Responder 2410 transmits dummy signal 2439 to initiator 2405 after the first repetition (i.e., after frames 2435) and initiator 2405 switches from receiving on a first receive antenna (Rx1) 2440 to receiving on a second receive antenna (Rx2) 2445.

In a third phase of operation, the initiator may send SSW feedback, e.g., using an SSW-FBCK frame, indicating the best Tx antenna (or antenna group) of the responder corresponding to the initiator Rx antennas, and indicating a CDOWN index corresponding to the responder sector in the transmission to the responder.

In the example SLS communications 2400, initiator 2405 transmits SSW-FBCK 2450 to responder 2410, indicating a Tx antenna sector of responder 2410 for transmitting to one or more of the Rx antennas of initiator 2405. The indicated Tx antenna sector of responder 2410 may be calculated as a function of CDOWN and N_repetition. For example, the best sector may be indicated as CDOWN number k in repetition m.

In a fourth phase of operation, the responder may send a message back to the initiator acknowledging the SSW feedback; e.g., using SSW-ACK frame. In the example SLS communications 2400, responder 2410 transmits SSW-ACK frame 2460 to initiator 2405 for this purpose. If there is a mismatch in the transmit and receive antennas for the initiator or responder, the procedure is complete if the STA (initiator or responder) is capable of transmitting and receiving on separate antennas.

In a fifth phase of operation, if the STA (initiator or responder) is not capable of transmitting and receiving on separate antennas, the SSW ACK frame may include a request for a further Tx or Rx SSW. In some examples, the STA may request a Rx SSW and fix the receive antenna to the antenna corresponding to the best Tx sector; the STA may request a Tx SSW and fix the Tx sector (or antenna) to the sector (or antenna) corresponding to the best transmission; the STA may request that the feedback be restricted to an antenna corresponding to the previous feedback in the second phase of operation; or the sectors and antennas may be used as input into a beam combining based BRP procedure to exhaustively search over the transmit and receive antennas/sectors for the best set.

In the example SLS communications 2400, SSW-ACK frame 2460 includes a request from responder 2410 to initiator 2405 for a further SSW of its Tx antennas with the receive antenna of initiator 2405 fixed on Rx1. Thereafter, responder 2410 transmits frames 2475 and 2476, one for each sector, and including CDOWN for each sector. Initiator 2405 is locked on and receives on first receive antenna Rx1 2580. After the SSW, initiator 2405 transmits feedback to responder 2410 indicating the best Tx antenna of responder 2410 in SSW-FBCK message 2580.

Concurrent receiving may be implemented, e.g., to address the BRP feedback without setup issue discussed earlier. For STAs which are capable of receiving concurrently using all RF chains, BF training overhead may be reduced. BF training with concurrent receiving chains may be implemented, for example, using various procedures and detailed frame formats.

For example, an initiator of the BF SLS training may send a setup frame to the responder to begin the BF SLS training. A setup frame may be a Grant frame, a BRP frame or an extended schedule element transmitted in the Beacon Header Interval (BHI). If a setup frame/element is in a BHI, the responder may not transmit a setup frame back to the initiator. A setup frame may carry various information, including a number of sectors for initiator TXSS, whether a responder TXSS is required in the SLS, a number of TXSS repeat times, and, if the setup frame and following training frames are in the same allocation, a duration field setting.

In more detail, the number of sectors for initiator TXSS field may indicate the number of sectors swept in the following initiator TXSS. For example, this number may be the number of sectors without repeating for responder to train different antennas. The responder TXSS may be required in the SLS. R-TXSS is optional. In this example, R-TXX is present. In the responder TXSS, the responder may repeat the sector sweeps for N_TXSS_Repeat times. The value N_TXSS_Repeat may be determined by the initiator and carried in the setup frame. If the setup frame and the following training frames are in the same allocation, the initiator may set allocation duration field by estimating the total duration including initiator TXSS duration, responder TXSS duration and feedback duration. The initiator TXSS duration may depend on the initiator TXSS Repeat, which may be determined by the responder. In this case, the initiator may estimate that value based on capabilities of the responder, if the responder is capable of setting a number of concurrent RX chains, or the initiator may assume that initiator TXSS repeat is 1, or another suitable (e.g., conservative) number. The initiator may later overwrite the duration field later in the training frames.

The responder of the BF SLS training may send a setup frame to the initiator. The setup frame may be a Grant ACK frame, or a BRP frame. The setup frame may carry various information, including a number of sectors for responder TXSS, a number of TXSS repeat times, and a total number of training frames and/or sequences to be transmitted in the responder TXSS.

In more detail, the number of sectors for responder TXSS field may indicate the number of sectors swept in the following responder TXSS. For example, this number may be the number of sectors without repeating for the initiator to train different receive antennas. In the initiator TXSS, the initiator may repeat the sector sweeps N_TXSS_Repeat times. The value N_TXSS_Repeat may be determined by the responder and carried in the setup frame. The total number of training frames/sequences to be transmitted in the responder TXSS may be calculated by the responder based on the information carried in the setup frame transmitted from the initiator.

The initiator may calculate the total number of training frames/sequences to be transmitted in the initiator TXSS based on the information received in the setup frame transmitted from the responder. The initiator may transmit the training frames accordingly. In the training frames, the duration field may be updated based on the initiator TXSS Repeat field set by the responder. After the Initiator TXSS, a Responder TXSS may be performed by the responder. Initiator and responder may thereafter feedback necessary information to each other.

Figure 25:
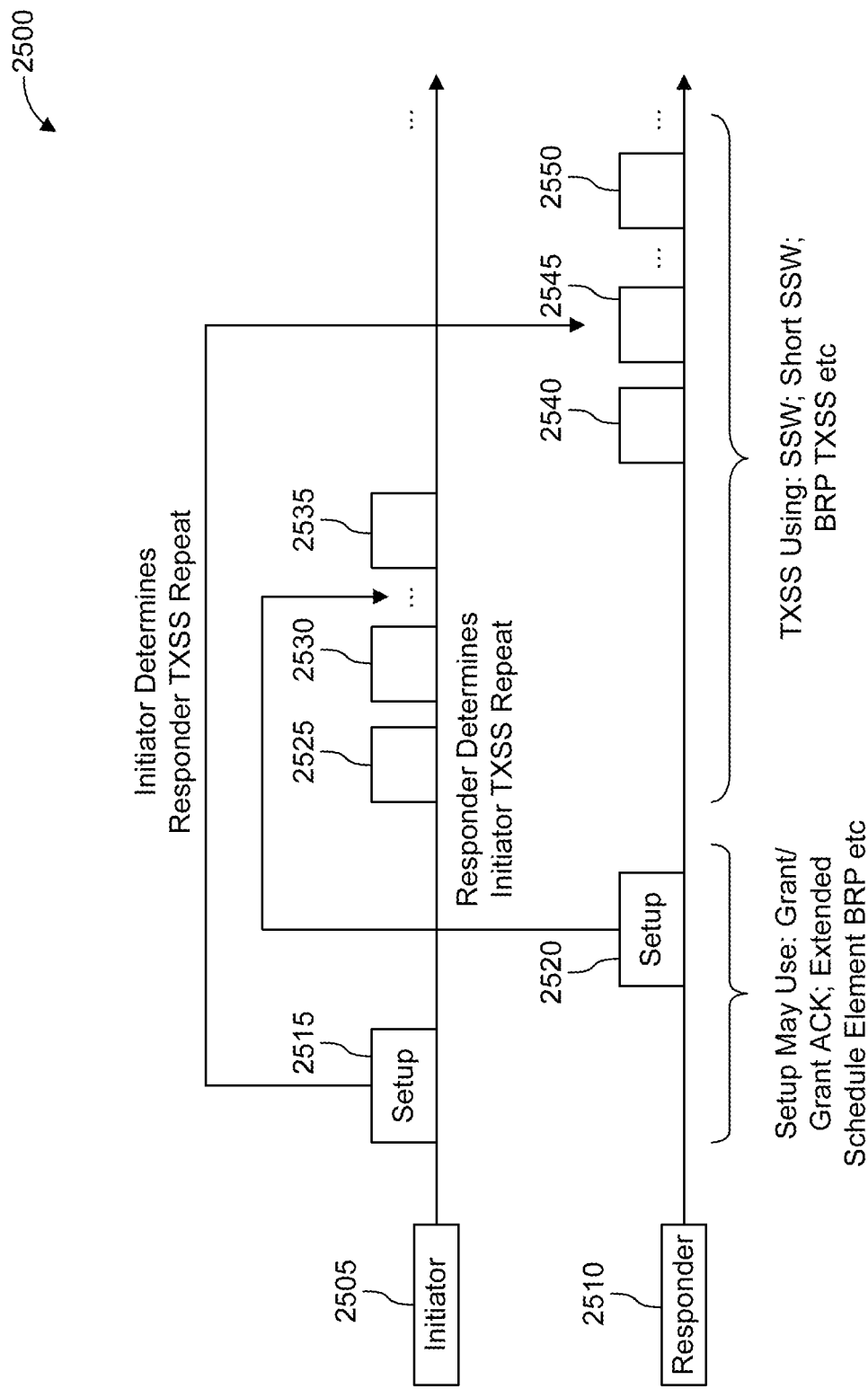
FIG. 25 is a signal diagram illustrating an example procedure for receiver-determined concurrent RX in BF training.

FIG. 25 is a signal diagram illustrating an example procedure 2500 for receiver-determined concurrent RX in BF training. The initiator 2505 of the BF SLS training may send a setup frame 2515 to the responder 2510 to begin the BF SLS training. A setup frame may be a Grant frame, a BRP frame or an extended schedule element transmitted in the Beacon Header Interval (BHI). If a setup frame/element is in a BHI, the responder may not transmit a setup frame back to the initiator. A setup frame may carry various information, including a number of sectors for initiator TXSS, whether a responder TXSS is required in the SLS, a number of TXSS repeat times, and, if the setup frame and following training frames are in the same allocation, a duration field setting. In example procedure 2500, setup frame 2515 includes a number of times responder 2510 should repeat transmitting TXSS. Responder 2510 sends a setup frame 2520 that includes a number of times initiator 2505 should repeat transmitting TXSS. Initiator 2505 transmits SSW frames 2525, 2530, . . . , 2535 to responder 2510, including a number of repeats based on setup frame 2520. Responder 2510 transmits SSW frames 2540, 2545, . . . , 2550 to initiator 2505, including a number of repeats based on setup frame 2515.

AP determined concurrent receiving may be implemented in BF training. For example, an AP is the initiator and a STA is the responder. The initiator and responder may exchange capabilities information. A number of concurrent RX chains/antennas (i.e., the number of RX chains or antennas that can receive concurrently) may be signaled in capability fields in the exchange.

The initiator of the BF SLS training may send a setup frame to begin the BF SLS training. The setup frame may be a Grant frame, a BRP setup frame or an extended schedule element transmitted in the Beacon Header Interval (BHI). In the last case, the responder may not transmit a setup frame back to the initiator. The setup frame may carry various information, including whether a responder TXSS is required in the SLS, a number of TXSS repeat times, a number of sectors for the initiator TXSS, and, if the setup frame and following training times are in the same allocation, a duration field setting.

In more detail, if responder TXSS is required in the SLS, the setup frame may indicate N_Responder_TXSS_Repeat; i.e., in the responder TXSS, the responder may repeat the sector sweeps for N_Responder_TXSS_Repeat times. The value N_Responder_TXSS_Repeat may be determined by the initiator and carried in the setup frame. If Responder TXSS may not present, the field may be reserved.

The setup frame may indicate N_Initiator_TXSS_Repeat; i.e., the initiator may determine, e.g., from the capability exchanges, the number of concurrent RX chains and/or antennas that the responder may support. For example, if the responder may support N_rx_chains concurrent RX chains/antennas, and intends to train N_rx antennas, then N_initiator_TXSS_Repeat_base=ceil(N_rx/N_rx_chains) Here, ceil(x) is a function to obtain the smallest integer which is greater than or equal to x. Therefore, based on the N_initiator_TXSS_Repeat_base value, the initiator may choose a N_Initiator_TXSS_Repeat value and signal it in the setup frame. The value indicates that the initiator may repeat the sector sweep N_Initiator_TXSS_Repeat times in the following initiator TXSS.

The setup frame may indicate a Number of sectors for Initiator TXSS. This field may indicate the number of sectors swept in the following Initiator TXSS. For example, this number may be the number of sectors without repeating for responder to train different antennas. If the setup frame and the following training frames are in the same allocation, the initiator may set an allocation duration by estimating the total duration including initiator TXSS duration, responder TXSS duration and feedback duration.

The responder may transmit a setup frame. The responder setup frame may include a number of sectors for Responder TXSS. This field may indicate, e.g., the number of sectors swept in the following Responder TXSS if it is presented. For example, this number may be the number of sectors without repeating for responder to train different antennas. Further, in the example procedure, the setup frames may be followed by the Initiator TXSS, Responder TXSS and feedback phases.

Figure 26:
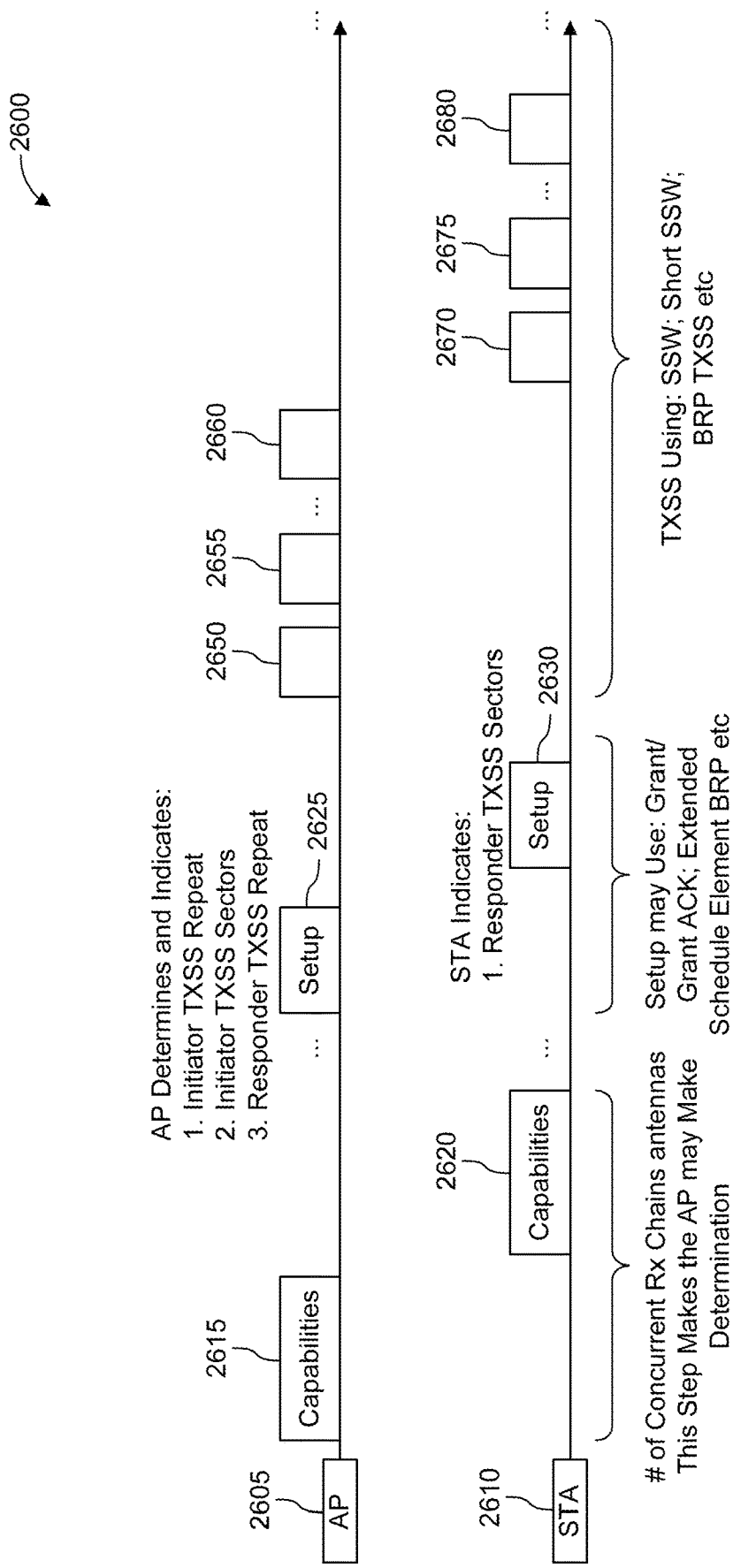
FIG. 26 is a signal diagram illustrating an example procedure for initiator determined concurrent RX in BF training.

FIG. 26 is a signal diagram illustrating an example procedure 2600 for AP determined concurrent RX in BF training. AP 2605 transmits capabilities to STA 2610 in frame 2615, and STA transmits capabilities to AP 2605 in frame 2620. In example procedure 2600, frame 2615 and 2620 include a number of receiver chains or antennas that can receive concurrently. AP 2605 sends setup frame 2625 to STA 2610, and STA 2610 sends setup frame 2630 to AP 2605. In example procedure 2600, setup frame 2625 indicates N_Responder_TXSS_Repeat, N_Initiator_TXSS_Repeat, and a number of sectors for Initiator TXSS, as discussed above, based on the exchanged capabilities information. For example, repeats may be calculated based on a relation such as N_repeat=N_antenna/N_concurrent_antennas, or any other suitable relationship. Setup frame 2630 indicates a number of sectors for Responder TXSS as discussed above. Thereafter, AP 2605 transmits SSW frames 2650, 2655, . . . , 2660 to STA 2610, repeating the SSW based on the setup frame 2625. STA 2610 transmits SSW frames 2670, 2675, . . . , 2680 to AP 2605, repeating the SSW based on the setup frame 2625.

Some implementations include concurrent receiver BF training without setting the number of TXSS repeats explicitly. In some examples, the initiator and responder may exchange capabilities information. For example, a number of concurrent RX chains and/or antennas may be signaled in capability fields. The initiator of the BF SLS training may send a setup frame to begin the BF SLS training. The setup frame may be, for example, a Grant frame, a BRP setup frame or an extended schedule element transmitted in the Beacon Header Interval (BHI). In the last case, the responder may not transmit a setup frame back to the initiator.

The setup frame may indicate a number of sectors for the initiator TXSS in a field which indicates the number of sectors swept in the following Initiator TXSS. For example, this number may be the number of sectors without repeating for responder to train different antennas. The setup frame may, if the setup frame and the following training frames may be in the same allocation, indicate an allocation duration. The initiator may set the allocation duration by estimating the total duration including initiator TXSS duration, responder TXSS duration and feedback duration. The estimated initiator TXSS duration and responder TXSS duration may be based on the number of concurrent RX chains and/or antennas capability field.

The responder may transmit setup frame, which may include a number of sectors for Responder TXSS field. This field may indicate the number of sectors swept in the following Responder TXSS. For example, this number may be the number of sectors without repeating for responder to train different antennas.

In the initiator TXSS, the initiator may transmit training frames. The initiator may sweep N transmit sectors, and repeat this for N_initiator_TXSS_Repeat times. The N_initiator_TXSS_Repeat may be calculated based on the number of concurrent RX chains/antennas supported by the responder. For example, if the responder may support N_rx_chains concurrent RX chains/antennas, and may intend to train N_rx antennas to train, then N_initiator_TXSS_Repeat=ceil(N_rx/N_rx_chains). Here, ceil(x) is a function to obtain the smallest integral which is greater than or equal to x.

In responder TXSS (if present), the responder may transmit training frames. The responder may sweep N transmit sectors, and repeat this for N_responder_TXSS_Repeat times. The N_responder_TXSS_Repeat may be calculated based on the number of concurrent RX chains/antennas supported by the initiator. For example, if the initiator may support N_rx_chains concurrent RX chains/antennas, and may intend to train N_rx antennas to train, then N_responder_TXSS_Repeat=ceil(N_rx/N_rx_chains).

Here, ceil(x) is a function to obtain the smallest integer which is greater than or equal to x. The initiator and responder may also transmit feedback frames.

Figure 27:
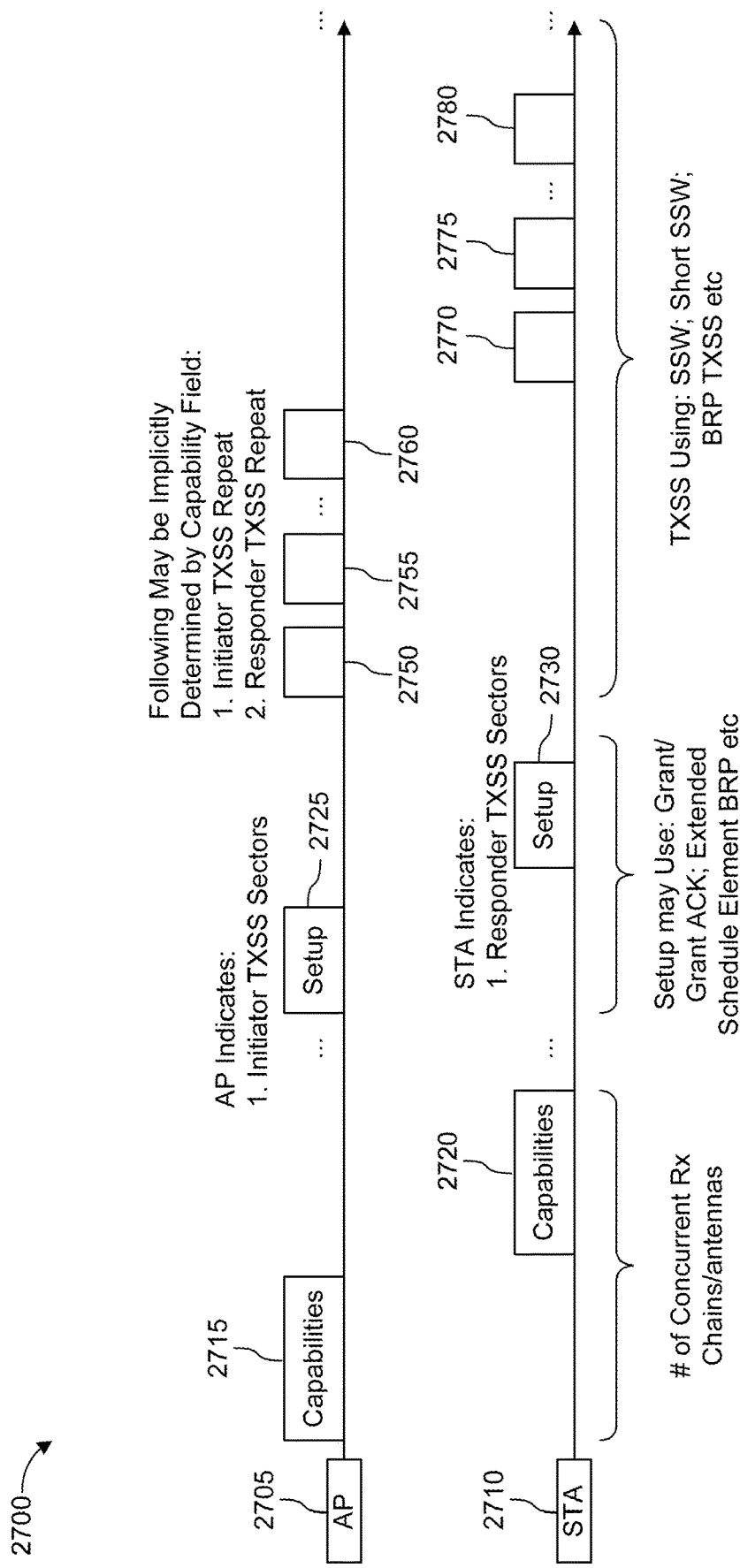
FIG. 27 is a signal diagram illustrating an example procedure for initiator determined concurrent RX in BF training.

FIG. 27 is a signal diagram illustrating an example procedure for initiator determined concurrent RX in BF training. In this procedure, AP is the initiator and STA is the responder. Some examples include concurrent Rx capability. For example, an EDMG STA may indicate whether it has the capability to concurrently receive using multiple Rx antennas. In some implementations, the EDMG STA may indicate whether it has the capability to concurrently receive using multiple Rx antennas by modifying and re-interpreting a DMG capability field. Current DMG STA Capability Information fields include a 'Number of Rx DMG Antennas' subfield. This subfield may be re-interpreted as a number of concurrent Rx DMG antennas, if the STA which is transmitting this field is an EDMG STA.

FIG. 27 illustrates an example procedure 2700 for concurrent receiver BF training without setting the number of TXSS repeats explicitly. AP 2705 transmits capabilities to STA 2710 in frame 2715, and STA transmits capabilities to AP 2705 in frame 2720. In example procedure 2700, frame 2715 and 2720 include a number of receiver chains or antennas that can receive concurrently. AP 2705 sends setup frame 2725 to STA 2710, and STA 2710 sends setup frame 2730 to AP 2705. In example procedure 2700, setup frame 2725 indicates a number of sectors for Initiator TXSS, as discussed above. Setup frame 2730 indicates a number of sectors for Responder TXSS as discussed above. Thereafter, AP 2705 transmits SSW frames 2750, 2755, . . . , 2760 to STA 2710, repeating the SSW based on an Initiator TXSS Repeat that is implicitly determined based on the number of receiver chains or antennas that can receive concurrently indicated in capability field 2720. STA 2710 transmits SSW frames 2770, 2775, . . . , 2780 to AP 2705, repeating the SSW based on a Responder TXSS Repeat that is implicitly determined based on the number of receiver chains or antennas that can receive concurrently indicated in the capability field 2715.

In some implementations, the EDMG STA may indicate whether it has the capability to concurrently receive using multiple Rx antennas. In some examples, a DMG capability field can be modified to indicate this capability. For example, a legacy Number of Rx DMG Antennas subfield of a DMG STA Capability Information field in the EDMG Capabilities element can be modified and re-interpreted for this purposes if the STA transmitting this field is an EDMG STA.

In some examples, a Number of Concurrent Rx DMG Antennas field can be added to an EDMG Capabilities element. A new Capabilities ID can be specified for a MIMO field, or a Multi-BF capability ID can be reused. In some examples, a 3 bit 'Number of concurrent Rx DMG antennas' field may be defined in the MIMO field. In another example, an existing beamforming field may be modified to carry the 3 bit 'Number of concurrent Rx DMG antennas' field. For example, an existing Beamforming Capability field has 7 reserved bits which may be used. A 3 bit 'Number of concurrent Tx DMG antennas' can also be defined in the capability field. Alternatively, the 3 bit 'Number of concurrent Rx DMG antennas' field may be replaced by a 1 bit 'Concurrent Rx' field. If this bit is set to 1, the STA may be able to receive using all of its RF chains.

Figures 28, 29:
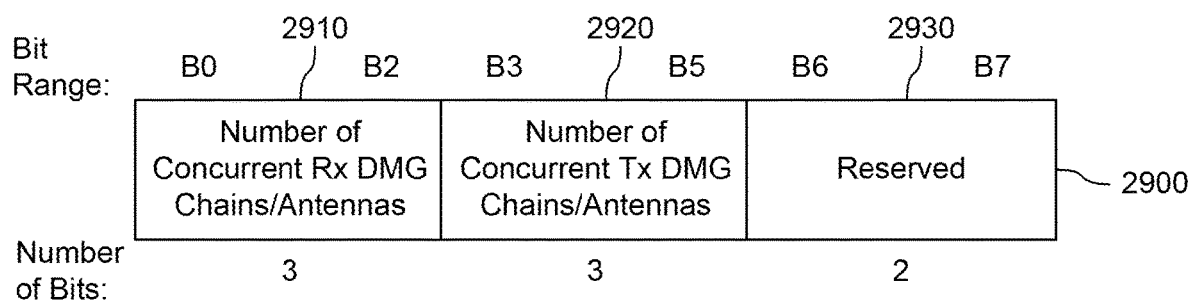
FIG. 28 is a table illustrating example modified capabilities identifications for an extended capabilities field.
FIG. 29 is a bitmap illustrating an example MIMO capability field or multi-BF capability field.

FIG. 28 is a table illustrating an example specification for a new Capabilities ID for the MIMO field. FIG. 29 is a bitmap illustrating an example re-use of a Multi-BF capability ID 2900. Multi-BF capability ID 2900 includes a Number of concurrent Rx DMG chains/antennas field 2910, Number of concurrent Tx DMG chains/antennas 2920, and a reserved field 2930.

Some implementations include a modified BF control field for Grant and/or Grant ACK. A BF Control field may be carried in a Grant and/or Grant ACK frame. The Grant and/or Grant ACK frame may be used to reserve and/or grant a BF training and/or SLS training opportunity respectively. For example, if both the IsInitiatorTXSS and IsResponderTXSS subfields are equal to 1 and the BF Control field is transmitted in Grant or Grant ACK frame, the BF Control field may be modified.

Figure 30:
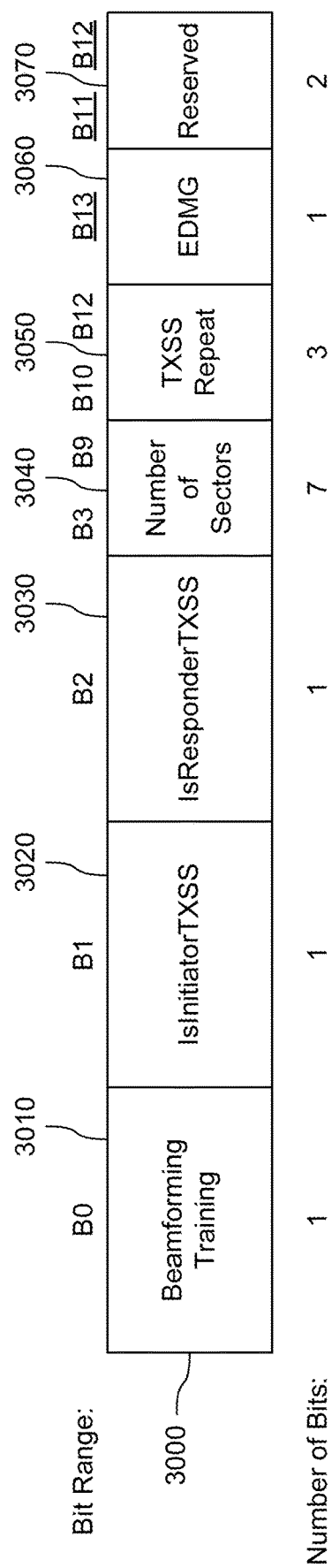
FIG. 30 is a bitmap illustrating an example modified BF Control field.

FIG. 30 is a bitmap illustrating an example modified BF Control field 3000. Modified BF Control field 3000 includes a Beamforming Training field 3010, an IsInitiator TXSS field 3020, an IsResponderTXSS field 3030, a Number of Sectors field 3040, a TXSS Repeat field 3050, a TXSS Repeat field 3060, an EDMG field 3060, and a Reserved field 3070.

In the modified BF Control field 3000, a legacy reserved bit may be used as EDMG bit 3060. If the EDMG bit 3060 is set to 0, the BF Control field 3000 may function as unmodified from the legacy control field. If the EDMG bit 3060 is set to 1, a 2 bit Number of Rx DMG Antennas field, which was present in legacy versions, may not be present, and the TXSS Repeat field 3050 (e.g., having 3 bits) may be added.

In some examples, if the BF Control field 3000 is transmitted in a Grant frame, the Number of Sectors field 3040 indicates the number of sectors the initiator uses during the Initiator TXSS. If the BF Control field 3000 is transmitted in a Grant ACK frame, the Number of Sectors field 3040 indicates the number of sectors the responder uses during the Responder TXSS. In both example cases, the total number of sectors used may be equal to the value of this field plus 1.

In some examples, the BF Control field 3000 is transmitted in a Grant frame. For example, the transmitter of the Grant frame may be an initiator and the receiver of the Grant frame may be a responder. In another example, an AP may grant a TXOP to two non-AP STAs. One of the non-AP STAs may be the initiator of the BF training and the other of the non-AP STAs may be the responder), the TXSS-Repeat field 3050, (e.g., value plus one) may indicate a number of times that the sectors swept in the Responder TXSS may be repeated. If the BF Control field 3000 is transmitted in a Grant ACK frame, the TXSS-Repeat field 3050, (e.g., value plus one) may indicate a number of times that the sectors swept in the Initiator TXSS may be repeated.

If the EDMG field 3060 is set to 1, the total number of sectors the initiator/responder uses during Initiator/Responder TXSS may be (Number of Sectors+1)*(TXSS Repeat+1). The initiator and responder may acquire the information regarding the number of concurrent Rx chains from Capability exchanges, and set TXSS Repeat 3050 accordingly. In the BF Control field 3000, a TXSS Repeat field 3050 transmitted by the initiator may be used to set the repeat times for Responder TXSS and a TXSS Repeat field 3050 transmitted by the responder may be used to set the repeat times for Initiator TXSS.

In another example, a TXSS Repeat field 3050 transmitted by the initiator may be used to set the repeat times for Initiator TXSS, and a TXSS Repeat field 3050 transmitted by the responder may be used to set the repeat times for Responder TXSS.

Alternatively, for a Grant frame, reserved bits in BF Control field 3000 and a Control trailer may be used together to signal a number of sectors and TXSS Repeats. This approach may permit more bits to be used. For example, 11 bits may be assigned for Number of Sectors, and 3 bits for TXSS Repeat. For a Grant ACK frame, a Control trailer is not defined. However, reserved bits in BF Control field 3000, and reserved bits (e.g., 5 bits) in a Grant ACK frame, may be used to signal the number of sectors and TXSS Repeat. This approach may permit more bits to be used. For example, 11 bits may be assigned for Number of Sectors, and 3 bits for TXSS Repeat.

Some examples provide a modified Control Trailer for a Grant Frame. In some examples, a BF Control field carried by a Grant frame may be modified; alternatively, a Control Trailer carried by the Grant frame may be modified as further discussed below. In other examples, the Grant frame may be modified by modifying both the BF Control field carried in the MAC body and the Control Trailer appended to the PPDU. Using this approach, some information may be transmitted in the BF Control field and some information may be transmitted in the Control Trailer.

An example Control Trailer defined for a Grant frame may include 30 reserved bits. In one example, 3 bits, or 6 bits, may be used for TXSS Repeat. The TXSS Repeat field may indicate that the Grant frame may be used to grant a BF training allocation; a number of sectors for TXSS (i.e., the number of sectors swept in the following Initiator TXSS. In some examples, this number is the number of sectors without repeating for the responder to train different antennas); the number of times that the sectors swept in the Responder TXSS may be repeated; and/or the number of times that the sectors swept in the Initiator TXSS may be repeated.

Some implementations provide a modified BF Control field for an Extended Schedule Element. In some examples, a modified BF Control field may be carried in an Extended Schedule Element, which may be used to reserve and/or grant a BF training and/or SLS training opportunity. There may be 6 reserved bits in the Extended Schedule Element, and the frame may be modified to include several bits for TXSS Repeat. Example modification options include a 1 Initial TXSS Repeat bit field, 3 Initial TXSS Repeat bit field, 1 Responder TXSS Repeat bit field, 3 Responder TXSS Repeat bit field, or modification of the existing 6 bit RXSS Length field.

Figure 31:
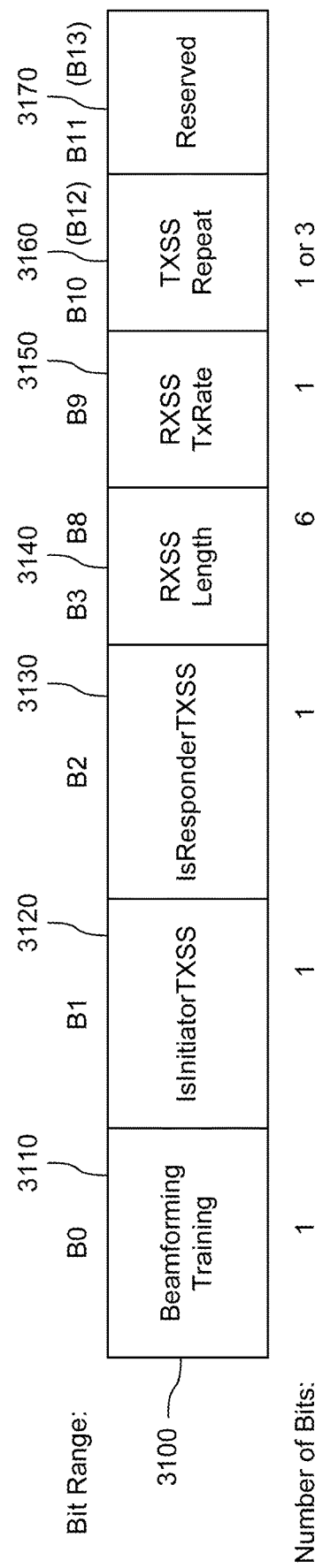
FIG. 31 is a bitmap illustrating an example modified BF Control field format for an Extended Schedule Element.

A 1 Initial TXSS Repeat bit field may indicate whether the Initial TXSS may or may not be repeated. A 3 Initial TXSS Repeat bit field may indicate whether the Initial TXSS may or may not be repeated, and if repeated, the number of times repeated. A 1 Responder TXSS Repeat bit field may indicate whether the Responder TXSS may or may not be repeated. A 3 Responder TXSS Repeat field may indicate whether the Responder TXSS may or may not be repeated, and if repeated, the number of times repeated. A modified 6 bit RXSS Length field may be reinterpreted as a number of sectors field, which may indicate the number of TXSS sectors (e.g., without repeating). In cases where 6 bits are insufficient, some reserved bits may also be used. Because the 6 bits are reinterpreted in this example, one reserved bit may be used to indicate whether the 6 bits are for an RXSS Length field or for the TXSS packet field. One or more of these modifications may be used to enable concurrent Rx in the scheduled BF training allocation. FIG. 31 is a bitmap which illustrates an example modified BF Control field format 3100 for an Extended Schedule Element. Modified BF Control field format 3100 includes a Beamforming Training field 3110, IsInitiatorTXSS field 3120, IsResponderTXSS field 3130, RXSS Length field 3140, RXSS TxRate field 3150, TXSS Repeat field 3160, and Reserved field 3070. Reserved field may have 3, 4, or 5 bits in some examples, or any suitable arbitrary number of bits.

Although the various features and elements herein are described in particular combinations, each feature or element can be used alone without the other features and elements of the preferred embodiments or in various combinations with or without other features and elements disclosed herein. Although the solutions described herein are described with respect to IEEE 802.11 specific protocols, it is understood that the solutions described herein are not restricted to IEEE 802.11 applications, but are applicable to other wireless systems and other as well.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a wireless transmit/receive unit WTRU, UE, terminal, base station, RNC, or any host computer.

The invention claimed is:

1. A station (STA) configured for beamforming (BF) training comprising:
a plurality of antennas;
a receiver configured to receive, from an initiator device, a first plurality of sector sweep (SSW) frames transmitted over first respective transmit (TX) sectors;
a transmitter configured to transmit, to the initiator device, a second plurality of SSW frames transmitted from the plurality of antennas over second respective TX sectors and including a value indicating a TX sector from among the first TX sectors;
the receiver configured to receive, from the initiator device, a SSW feedback (FB) frame including a value indicating a TX sector from among the second TX sectors; and
the transmitter configured to transmit, to the initiator device, a SSW acknowledgement (ACK) frame including a value indicating a TX sector from an antenna of the initiator device that transmitted the SSW FB frame.

2. The STA of claim 1, wherein the STA comprises a responder device.

3. The STA of claim 1, wherein the STA comprises a wireless transmit/receive unit (WRTU).

4. The STA of claim 1, wherein the initiator device comprises a wireless access point (AP).

5. The STA of claim 1, wherein the SSW FB frame comprises a short SSW FB frame.

6. A method for beamforming (BF) training in a station (STA) comprising a plurality of antennas, the method comprising:
receiving, from an initiator device, a first plurality of sector sweep (SSW) frames transmitted over first respective transmit (TX) sectors;
transmitting, to the initiator device, a second plurality of SSW frames transmitted from the plurality of antennas over second respective TX sectors and including a value indicating a TX sector from among the first TX sectors;
receiving, from the initiator device, a SSW feedback (FB) frame including a value indicating a TX sector from among the second TX sectors; and
transmitting, to the initiator device, a SSW acknowledgement (ACK) frame including a value indicating a TX sector from an antenna of the initiator device that transmitted the SSW FB frame.

7. The method of claim 6, wherein the STA comprises a responder device.

8. The method of claim 6, wherein the STA comprises a wireless transmit/receive unit (WTRU).

9. The method of claim 6, wherein the initiator device comprises a wireless access point (AP).

10. The method of claim 6, wherein the SSW FB frame comprises a short SSW FB frame.

11. A station (STA) configured for beamforming (BF) training comprising:
a plurality of antennas;
a transmitter configured to transmit, to a responder device, a first plurality of sector sweep (SSW) frames transmitted over first respective transmit (TX) sectors;
a receiver configured to receive, from the responder device, a second plurality of SSW frames transmitted from the plurality of antennas over second respective TX sectors and including a value indicating a TX sector from among the first TX sectors;
the transmitter configured to transmit, to the responder device, a SSW feedback (FB) frame including a value indicating a TX sector from among the second TX sectors; and
the receiver configured to receive, from the responder device, a SSW acknowledgement (ACK) frame including a value indicating a TX sector from an antenna of the STA that transmitted the SSW FB frame.

12. The STA of claim 11, wherein the STA comprises an initiator device.

13. The STA of claim 11, wherein the responder device comprises a wireless transmit/receive (WTRU).

14. The STA of claim 11, wherein the STA comprises a wireless access point (AP).

15. The STA of claim 11, wherein the SSW FB frame comprises a short SSW FB frame.

16. A method for beamforming (BF) training in a station (STA) comprising a plurality of antennas, the method comprising:
   transmitting, to a responder device, a first plurality of sector sweep (SSW) frames transmitted over first respective transmit (TX) sectors;
   receiving, from the responder device, a second plurality of SSW frames transmitted from the plurality of antennas over second respective TX sectors and including a value indicating a TX sector from among the first TX sectors;
   transmitting, to the responder device, a sector sweep feedback (SSW FB) frame including a value indicating a TX sector from among the second TX sectors; and
   receiving, from the responder device, a SSW acknowledgement (ACK) frame including a value indicating a TX sector from an antenna of the STA that tranmsitted the SSW FB frame.

17. The method of claim 16, wherein the STA comprises an initiator device.

18. The method of claim 16, wherein the responder device comprises a wireless transmit/receive unit (WTRU).

19. The method of claim 16, wherein the STA comprises a wireless access point (AP).

20. The method of claim 16, wherein the SSW FB frame comprises a short SSW FB frame.

* * * * *